(12) United States Patent
De Meulemeester et al.

(10) Patent No.: US 12,480,311 B2
(45) Date of Patent: Nov. 25, 2025

(54) ROOF CONSTRUCTION FOR A CANOPY, KIT OF PARTS FOR ASSEMBLING THE ROOF CONSTRUCTION, AND METHOD FOR PLACING A LEDSTRIP IN THE ROOF CONSTRUCTION

(71) Applicant: Renson Outdoor NV, Waregem (BE)

(72) Inventors: Lennart De Meulemeester, Ledeberg (BE); Thomas De Rycke, Ghent (BE); Kristof Lemiegre, Gentbrugge (BE)

(73) Assignee: RENSON OUTDOOR NV, Kruisem (BE)

( * ) Notice: Subject to any disclaimer, the term of this patent is extended or adjusted under 35 U.S.C. 154(b) by 318 days.

(21) Appl. No.: 18/031,955

(22) PCT Filed: Oct. 20, 2021

(86) PCT No.: PCT/IB2021/059646
§ 371 (c)(1),
(2) Date: Apr. 14, 2023

(87) PCT Pub. No.: WO2022/084869
PCT Pub. Date: Apr. 28, 2022

(65) Prior Publication Data
US 2023/0392408 A1    Dec. 7, 2023

(30) Foreign Application Priority Data

Oct. 22, 2020    (BE) .................................. 2020/5738

(51) Int. Cl.
*E04F 10/00*    (2006.01)
*E04B 1/00*    (2006.01)
(Continued)

(52) U.S. Cl.
CPC ............ *E04F 10/00* (2013.01); *E04B 1/0046* (2013.01); *E04B 1/2403* (2013.01); *E04B 7/14* (2013.01);
(Continued)

(58) Field of Classification Search
CPC ........ E04B 1/0046; E04B 1/2403; E04B 7/14; E04C 3/07; E04C 2003/0413;
(Continued)

(56) References Cited

U.S. PATENT DOCUMENTS 3,222,841  A  *  12/1965  Lipof ........................ E04C 3/06
                                                                52/63
4,761,720  A        8/1988  Solow
(Continued)

FOREIGN PATENT DOCUMENTS

CA          2920207 A1      8/2017
DE      102005033777 A1     1/2007
(Continued)

OTHER PUBLICATIONS

International Search Report for PCT Application No. PCT/IB2021/059646, dated Jan. 25, 2022, 17 pages.

*Primary Examiner* — Jessie T Fonseca
(74) *Attorney, Agent, or Firm* — Dickinson Wright PLLC

(57) ABSTRACT

A roof construction for a canopy is disclosed. The roof construction is provided with two beams making an angle with each other, each having an inner side and an outer side; a corner piece positioned between the beams, which corner piece has an inner side and an outer side; and a LED strip light that extends substantially continuously over the outer side of said corner piece and over the outer side of at least a part of each of said beams. The provision of a LED strip light on the outer side of the roof construction offers an additional option for providing lighting for a canopy.

20 Claims, 13 Drawing Sheets

(51) Int. Cl.
*E04B 1/24* (2006.01)
*E04B 7/14* (2006.01)
*E04C 3/07* (2006.01)
*E04H 6/02* (2006.01)
*E04H 15/10* (2006.01)
*E04H 15/34* (2006.01)
*E04C 3/04* (2006.01)

(52) U.S. Cl.
CPC ............... *E04C 3/07* (2013.01); *E04H 6/025* (2013.01); *E04H 15/10* (2013.01); *E04H 15/34* (2013.01); *E04C 2003/0413* (2013.01); *E04C 2003/0439* (2013.01)

(58) Field of Classification Search
CPC .. E04C 2003/0439; E04F 10/00; E04H 6/025; E04H 15/10; E04H 15/34
See application file for complete search history.

(56) References Cited

U.S. PATENT DOCUMENTS

| | | | | |
|---|---|---|---|---|
| 6,192,643 | B1* | 2/2001 | Zadok | E04H 3/16 |
| | | | | 52/DIG. 17 |
| 9,932,734 | B1* | 4/2018 | Winter | E04B 1/1903 |
| 2002/0127368 | A1* | 9/2002 | Richardson | E04F 19/0463 |
| | | | | 428/100 |
| 2002/0189191 | A1* | 12/2002 | Strassle | E04B 2/78 |
| | | | | 403/171 |
| 2016/0333587 | A1* | 11/2016 | Veys | E04F 10/0685 |
| 2018/0127982 | A1 | 5/2018 | Lemiegre | |
| 2018/0291613 | A1* | 10/2018 | Jackson | E04H 6/025 |
| 2019/0186167 | A1* | 6/2019 | Ji | E04H 15/008 |

FOREIGN PATENT DOCUMENTS

| | | |
|---|---|---|
| DE | 102016117774 A1 | 3/2018 |
| WO | 2018129577 A1 | 7/2018 |

* cited by examiner

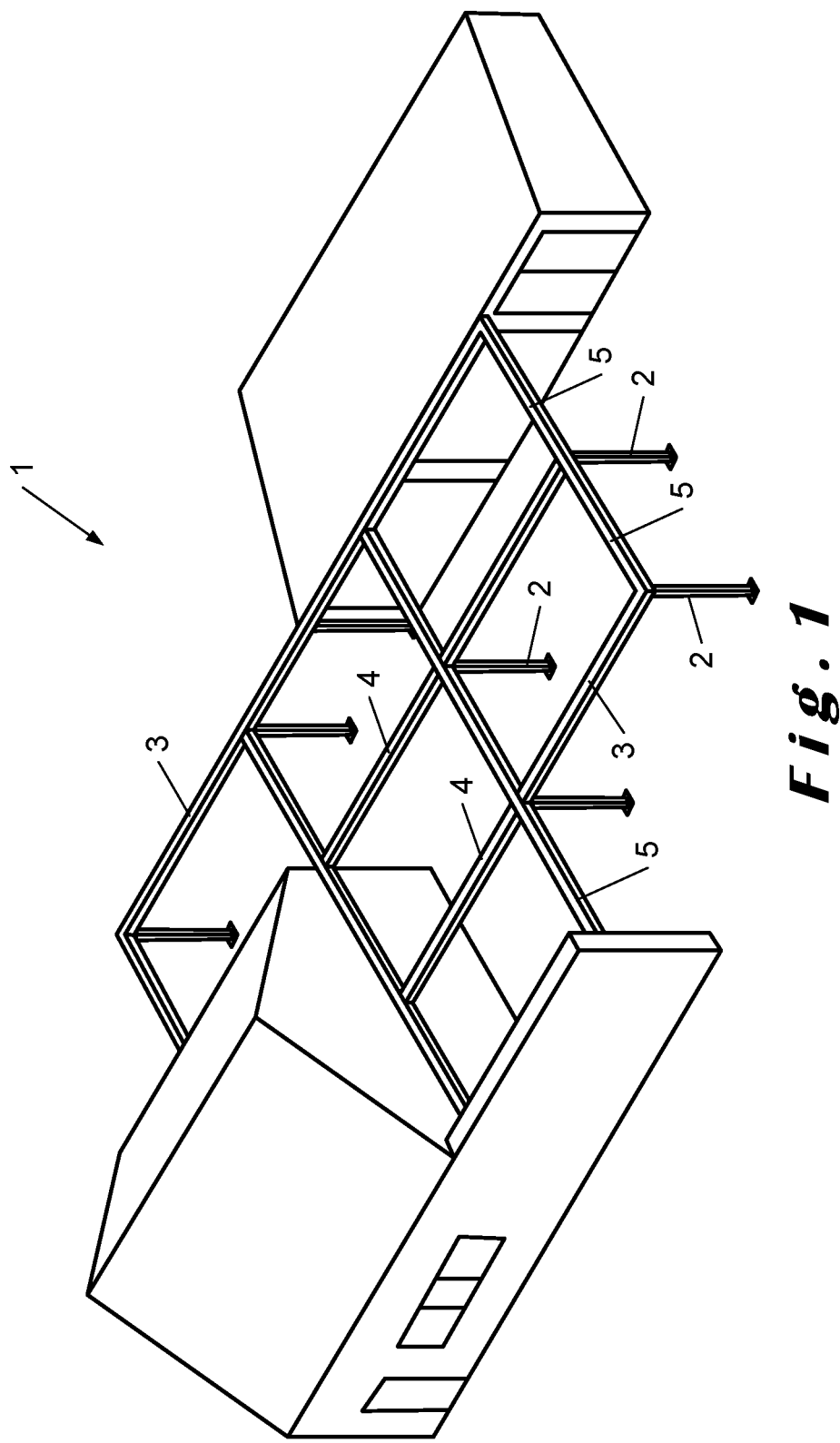

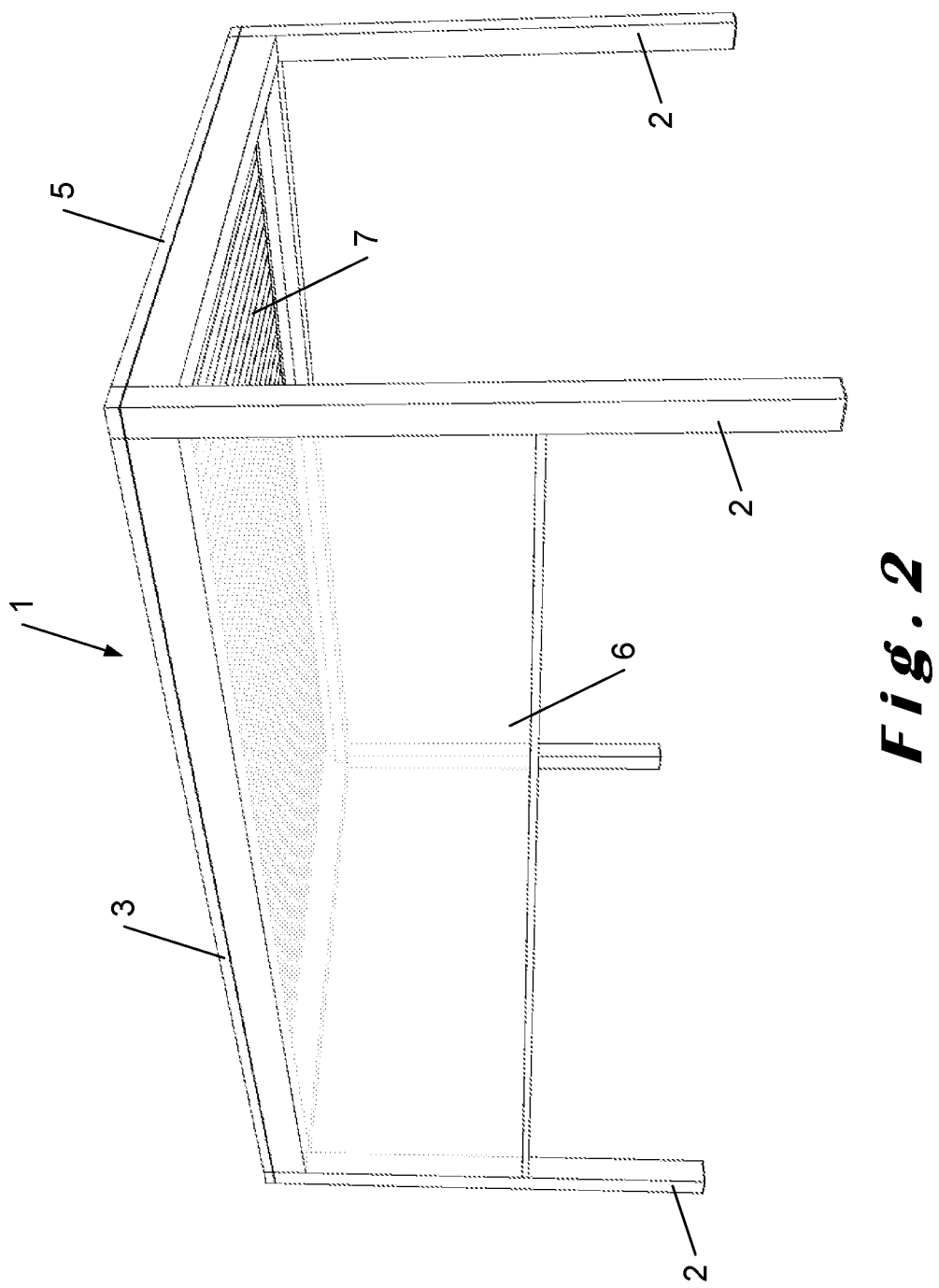

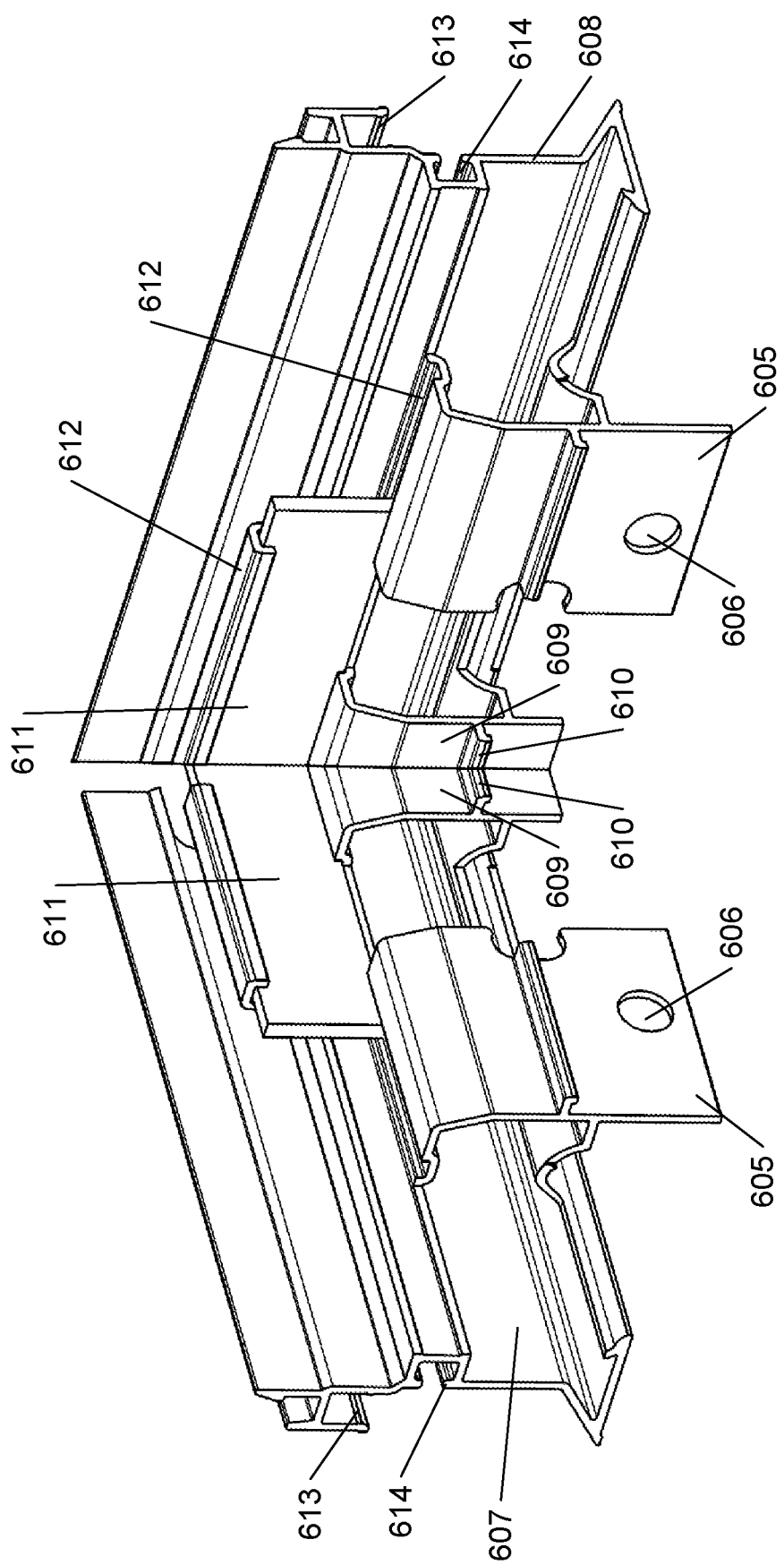

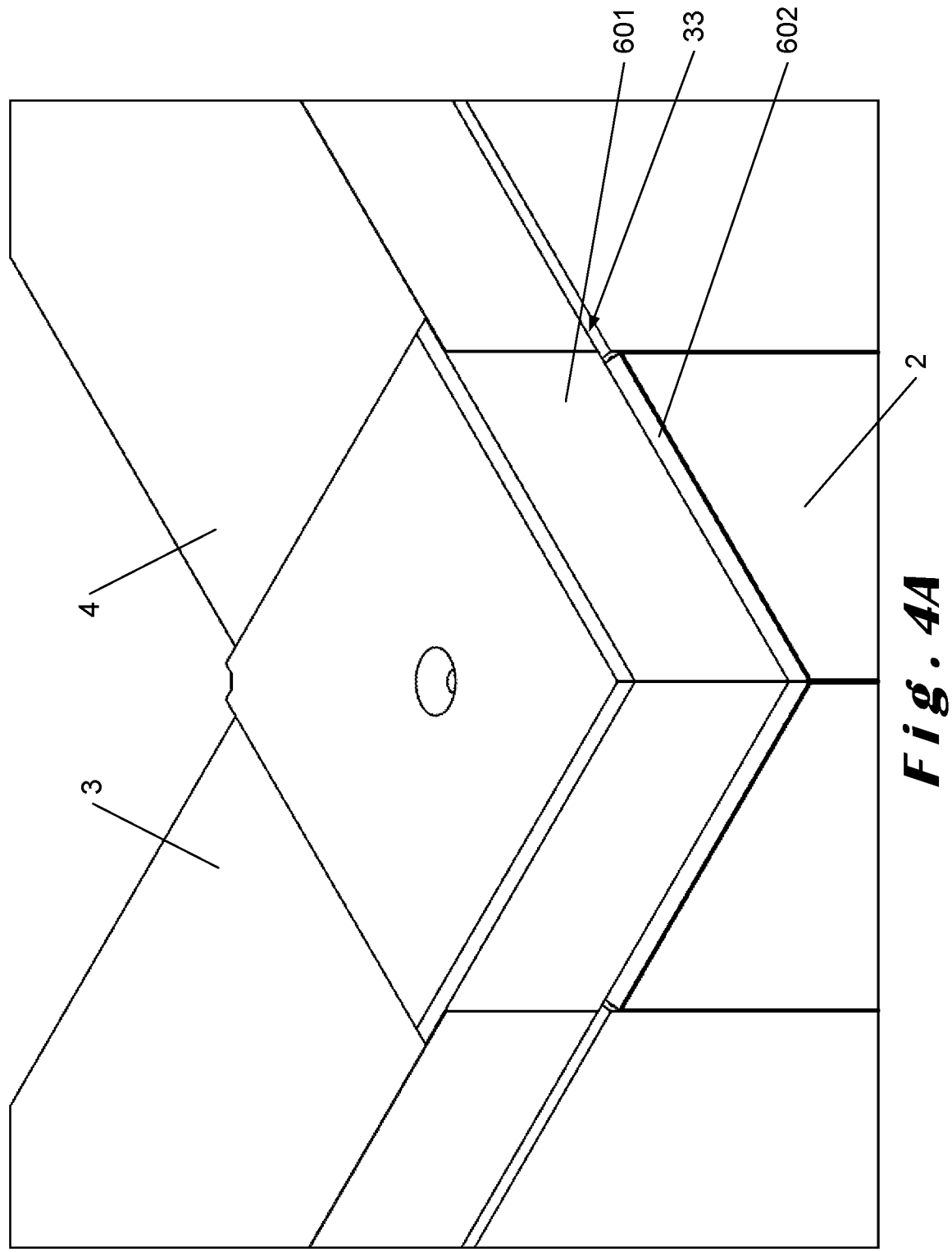

ROOF CONSTRUCTION FOR A CANOPY, KIT OF PARTS FOR ASSEMBLING THE ROOF CONSTRUCTION, AND METHOD FOR PLACING A LEDSTRIP IN THE ROOF CONSTRUCTION

CROSS-REFERENCE TO RELATED APPLICATION(S)

This present application is a national stage application of International Patent Application No. PCT/IB2021/059646, filed Oct. 20, 2021, which claims priority to Belgium Patent Application No. BE2020/5738, filed Oct. 22, 2020, the disclosures of which are hereby incorporated by reference in their entireties.

TECHNICAL FIELD OF THE INVENTION

The present invention relates to a roof construction for a canopy. The present invention also relates to a kit of parts for assembling the roof construction, and a method for placing a LED strip in the roof construction.

STATE OF THE ART

Canopies are generally put up to protect an outside area or simply to free up this space. Such canopies are often set up in this way at homes, restaurants, shops, etc. to protect an outdoor terrace or the like from the sun, precipitation and/or wind or simply to let the sun in for a while. These canopies can, for example, be constructed in the form of an awning, a pergola, a veranda, a car port, a pavilion, etc.

Such a canopy typically comprises a roof construction that is at least in part supported by columns. Exceptionally, the roof construction can also be supported by another roof structure. The roof construction is generally built from a number of beams assembled to form one or more frames in which a roof infill can be secured. The actual beams are often a combination of a number of individual profiles. Such a roof construction is typically supported by four (or more) columns between which a wall infill can be provided. Fewer columns can also be used in the event that the roof construction is supported by other structures, such as a wall of an existing structure.

The wall infill can be fixed or moveable, for example a sliding roof. The roof infill of a sliding roof can, for example, consist of a retractable canvass or screen, slats rotating around their axis, or segments that can slide over one another. The segments can be panels that are (partially) made of metal, such as aluminium, (laminated) glass or plastic, such as polycarbonate (PC) or polymethylmethacrylate (PMMA). The wall infill can similarly be fixed or moveable. Examples include a retractable roof or screen or moveable, i.e. sliding or folding, panels. Through the choice of material, the light transmission and the robustness of the roof infill and/or wall infill can be matched to the desired application.

In the context of a roof construction for canopies there are typically four orientations involved (namely above, below, outer side, and inner side) for the frame of the roof construction. Here, "above" refers to the part of the roof construction which is or will be oriented towards the upper surface (i.e. the sky, e.g. the open air), "below" to the part of the roof construction which is or will be oriented towards the lower surface (i.e. the ground, e.g. the terrace floor), "outer side" to the part of the roof construction which is or will be oriented away from the roof (i.e. away from the roof infill) and "inner side" to the part of the roof construction which is or will be oriented towards the inner side of the roof (i.e. directed towards the roof infill).

With canopies it is already known to provide lighting for the area beneath the canopy. More specifically, it is known to provide one or more LED strips on the inner side of the frame of the roof construction. In doing so, one LED strip per beam is typically provided whereby the end of the LED strip is aligned with the extremity of the beam visible from the inner side, and the start of the LED strip (to which the power supply is attached) is incorporated into the frame of the roof construction at the other extremity of the beam.

DESCRIPTION OF THE INVENTION

It is an aim of the present invention to provide more options as regards lighting of a roof construction for a canopy.

This aim is achieved by a roof construction for a canopy, wherein the roof construction is provided with: at least two beams making an angle with each other, each having an inner side and an outer side; a corner piece positioned between said beams, which corner piece has an inner side and an outer side; and a LED strip light that extends substantially continuously, in particular continuously, over the outer side of said corner piece and over the outer side of at least a part of each of said beams.

The provision of a LED strip light on the outer side of the roof construction offers an additional option for providing lighting for a canopy. Moreover, it is advantageous to allow the LED strip to run along the outer side of the corner piece to maximise the lighting.

In an embodiment of the present invention said corner piece comprises a start profile and an end profile, each of which has a beam edge, a corner edge, an inner edge and an outer edge, wherein the beam edge and the corner edge are opposite each other and wherein the inner edge and the outer edge are opposite each other, wherein the inner edges of the start profile and the end profile together form the inner side of the corner piece and wherein the outer edges of the start profile and the end profile together form the outer side of the corner piece, wherein the start profile substantially joins at its beam edge a first of said beams, wherein the end profile substantially joins at its beam edge a second of said beams and wherein the corner edges of the start profile and the end profile at least partially align with each other, wherein said LED strip light comprises at least two LED strips (namely a first LED strip and a second LED strip) each comprising a start section with a first extremity and an end section with a second extremity.

The use of multiple LED strips is advantageous to limit lumen degradation. Typically, a LED strip has a maximum length (e.g. 5 or 6 metres) because the quantity of available electricity decreases the more LEDs that are positioned next to each other without provision of an additional power source. The use of multiple LED strips per roof construction therefore allows the entire perimeter of the roof construction to be provided with an substantially continuous light intensity independently of the perimeter of the roof construction, which perimeter is typically greater than the usual maximum length of a LED strip.

It will be readily appreciated that the corner piece, though described with reference to a start profile and an end profile which are preferably separate elements that are secured to one another, can also be manufactured as an integral element. The provision of separate start profiles and end profiles allows these to be manufactured separately by means of an extrusion process.

It will also be readily appreciated that the start profile can be manufactured as an integral part of the first beam and the end profile of the second beam. Manufacture of the start profile as an integral part of the first beam and the end profile of the second beam results in a roof construction with fewer components.

In a first alternative advantageous embodiment of the present invention the first LED strip is positioned in the start profile and said first beam and the second LED strip in the end profile and said second beam, wherein the start section of the first LED strip, near to the corner edge of the start profile, is bent such that the first extremity of the first LED strip is situated on the inner side of the corner piece and wherein the second extremity of the second LED strip is positioned on the corner edge of the corner piece.

In this embodiment the start of the first LED strip (where the power supply is normally present), by means of the bend in the start section of the LED strip, is incorporated on the inner side of the corner piece and the end of the second LED strip is positioned such that this sits on the extremity of the corner piece. Each LED strip therefore extends substantially (with the exception of the start section) in a straight line along one outer side wall of the roof construction. Thus, in this embodiment, there is a partial overlap of the two LED strips in the angle of the corner piece.

In a second alternative advantageous embodiment of the present invention said first LED strip is positioned in said first beam, and the start profile and the end profile and the second LED strip in said second beam, wherein the start section of the first LED strip, near to the beam edge of the end profile, is bent such that the first extremity of the first LED strip is positioned on the inner side of the corner piece and wherein the second extremity of the second LED strip is positioned on the extremity of the second beam which substantially joins the beam edge of the end profile. In particular, the second LED strip in this alternative advantageous embodiment of the present invention comprises two separate LED strips of which a first is positioned in said second beam and a second is positioned in the corner piece.

In this embodiment the start of the first LED strip (where the power supply is normally present), by means of the bend in the start section of the LED strip, is incorporated on the inner side of the corner piece and the end of the second LED strip is positioned such that this sits on the extremity of a beam. Thus, in this embodiment, there is a partial overlap of the two LED strips near to the transition from the beam to the corner piece. Moreover, by means of the use of a further at least two (or three) LED strips to form the second LED strip (and optionally also the first LED strip) it is possible to provide each separate profile (i.e. each beam and the corner piece and/or each profile of the corner piece) of the roof construction with its own individual LED strip wherein the start sections of the LED strips are concealed at the transition between the beams and the corner piece.

In a third alternative advantageous embodiment of the present invention said first LED strip is positioned in said first beam and the second LED strip in the start profile, the end profile, said first beam and said second beam, wherein the start section of the first LED strip is bent such that the first extremity of the first LED strip is situated on the inner side of said second beam and wherein the second extremity of the second LED strip is positioned near to the bent part of the first LED strip.

In this embodiment the start of the first LED strip (where the power supply is normally present), by means of the bend in the start section of the LED strip, is incorporated on the inner side of the beam and the end of the second LED strip is positioned such that this partially overlaps with the inwardly bent section. Thus, in this embodiment, there is a partial overlap of the two LED strips in the beam.

In each of these advantageous embodiments the transition between the LED strips is substantially invisible, in particular due to the partial overlap, as a result of which the two LED strips together appear to form a continuous LED strip. Furthermore the power supply is also incorporated (typically at the start of the LED strip) on the inner side of the roof construction such that power cables and the like can be positioned without them being visible on the outer side of the canopy.

Moreover, the concealment of the start of each LED strip on the inner side of the roof construction (i.e. the inner side of the corner piece or the inner side of a beam) has a further advantage. The fact is that usually LED strips can only be cut to specific lengths, for example with an accuracy of approximately 50 mm. But the roof construction of a bespoke canopy typically has an accuracy of approximately 1 mm. This means that it is often impossible to make the LED strip exactly the same length as the total length of one side of the roof construction. The bent start section of the LED strip allows the LED strip to be made longer than the side and the piece that has been cut too long can be concealed on the inner side of the roof construction so that this is not visible on the outer side.

The first alternative advantageous embodiment is preferable to the other alternative advantageous embodiments. The fact is that, with the second advantageous embodiment, the start section of the LED strip typically has to be bent 180°, whereas this is just 90° in the first advantageous embodiment. Furthermore, for the third advantageous embodiment it is necessary for a parallel channel (next to where the LED strip is fitted) to be provided in the beam for the inwardly bent section of the LED strip. Because the beams are typically made using an extrusion process, this means that such a parallel channel must be provided over the entire length of the beam, which makes the extrusion process more difficult, requires more material and therefore increases the cost of the beam. Such a parallel channel in the beam also takes up space, as a result of which the space is no longer available for providing another function in the beam or the beam will have to be made larger overall.

A further advantage of the first alternative advantageous embodiment is that it is possible to position each LED strip in the beam in advance while only a minimal quantity of LED strip still has to protrude, namely (slightly more than) the length of the start profile of the corner piece on both sides of the beam. An LED strip positioned in advance reduces the time required to build the roof construction when placing the canopy. Though positioning in advance of the LED strips is still possible with the second alternative advantageous embodiment, a longer section of LED strip has to protrude from the beam, as a result of which the risk of damage during transport, placement, and so on, is increased. In the third alternative advantageous embodiment the positioning in advance of the LED strips is not possible.

In an advantageous embodiment of the present invention the start profile, from its beam edge over a section of its length, is provided with a LED strip holder in which a section of said LED strip light is placed, wherein said section is smaller than its length, in particular smaller than 95%, more particularly smaller than 90% of its length and in particular larger than 50%, more particularly larger than 70%, most particularly larger than 80%, of its length.

Because the LED strip holder does not extend over the entire length of the start profile there is a gap present in which the bent start section of the LED strip can be placed. Furthermore, it is advantageous to provide the LED strip holder over the largest possible section of the start profile because then the LED strip can be secured to the start profile over as much as possible of its length.

In an advantageous embodiment of the present invention the end profile is provided over its entire length with a LED strip holder in which a section of said LED strip light is placed.

It is advantageous to provide the LED strip holder over the largest possible section of the end profile because then the LED strip can be secured to the end profile over as much as possible of its length.

In a more advantageous embodiment of the present invention each LED strip holder is formed by a U-shaped part of the start profile or end profile, respectively, wherein the open side of the U-shaped part is in particular directed towards the underside of the corner piece. Preferably, in combination with the first alternative advantageous embodiment, the start section of the first LED strip at least partially abuts against the U-shaped part of the end profile.

A U-shaped part is first of all relatively easy to form with an extrusion process such that the start profile and the end profile can be formed by means of extrusion. Furthermore, it is also relatively easy to place a LED strip in a U-shaped part so that the roof construction can be rapidly and simply manufactured.

In an alternative more advantageous embodiment of the present invention each LED strip holder is formed by an substantially flat plate section. Such a plate section can serve for the bonding of a LED strip, which is in particular advantageous with self-adhesive LED strips.

In an advantageous embodiment of the present invention the start profile and the end profile each have a slideable wall section on their inner edge, which wall sections make an angle with each other.

These slideable wall sections are attached first (i.e. before the corner piece is placed in the remainder of the roof construction). This allows the outer side walls of the corner piece (i.e. the outer side walls of the start profile and the end profile) to align with each other to obtain an outer side corner without gaps. In other words, this allows tolerances to be compensated for during the manufacture of the various profiles.

In an embodiment of the present invention the roof construction is also provided with a cover that is placed on top of the corner piece, wherein, on the outer side of the corner piece, an elongated recess is present between the cover and the corner piece.

The elongated recess allows light from the LED strip to be visible on the outer side of the roof construction while the LED strip itself is incorporated in the roof construction and therefore is not or at least less exposed to the natural elements, such as wind, rain, and so on.

In an embodiment of the present invention the corner piece is provided with a diffuser holder which, in particular, is positioned below said LED strip light, wherein the roof construction is further provided with at least one diffuser which is at least partially supported by the diffuser holder. Preferably, the diffuser comprises a transparent hollow tube.

The diffuser and diffuser holder ensure that the light generated by the LED strip is diffused with a uniform appearance. A hollow transparent tube is preferable as this optimises the light diffusion.

In an advantageous embodiment of the present invention the transparent hollow tube is wedged between the cover and the corner piece, in particular near to said elongated recess.

In this way, the transparent hollow tube prevents dirt and/or creatures from being able to access the LED strip via the elongated recess, which would adversely affect the uniformity of the light generated by the LED strip.

In an advantageous embodiment of the present invention the diffuser holder is formed by a further U-shaped part of the corner piece, wherein the open side of the of the further U-shaped part is in particular directed towards the outer side of the corner piece.

A U-shaped part is first of all relatively easy to form with an extrusion process such that the start profile and the end profile can be formed by means of extrusion. Furthermore, it is also relatively easy to place a diffuser in a U-shaped part so that the roof construction can be rapidly and simply manufactured.

In a more advantageous embodiment of the present invention the diffuser further comprises a plate section that is rigidly fixed in the diffuser holder, wherein said transparent hollow tube is rigidly fixed to the underside of the plate section.

The result of this plate section is that there is a vertical clearance between the LED strip and the transparent hollow tube serving as a diffuser. In this way, the transparent hollow tube can be placed as close as possible to the elongated recess, as a result of which possible effects from the colouring of the profiles (i.e. the beam, the end profile, the start profile, the cover, etc.) on the colour of the light from of the LED are lessened.

In an advantageous embodiment of the present invention said at least one diffuser comprises a first diffuser and a second diffuser, wherein the first diffuser is positioned in the start profile and said first beam and the second diffuser in the end profile and said second beam, wherein each diffuser preferably extends over the entire length of the first, or second, beam and start profile, or end profile.

In this way there is one diffuser for each side of the roof construction, such that it is not necessary to bend the diffuser at a corner of the roof construction.

In an embodiment of the present invention the roof construction is provided with at least four beams which together form a frame, in particular a substantially rectangular frame, wherein a corner piece identical to said corner piece is provided between each two beams making an angle with each other, wherein said LED strip light runs substantially continuously, in particular continuously, over the outer side of each corner piece and over the outer side of each of said at least four beams.

It is therefore possible to have a LED strip that extends substantially continuously, in particular continuously, over each of the four sides and outer side corners of the roof construction.

In an embodiment of the present invention said beams at least partially directly join together, wherein said corner piece is formed by a section of a first beam of said beams and a section of a second beam of said beams.

This simplifies the design of the roof construction because there is no longer any need for a separate corner piece. One possible way of directly joining the beams together is, for example, with a mitred joint.

In an advantageous embodiment of the present invention the LED strip light comprises a first LED strip and a second LED strip each comprising a start section with a first extremity and an end section with a second extremity, wherein the first LED strip is substantially positioned in a first beam of said beams and the second LED strip is substantially positioned in a second beam of said beams, wherein the start section of the first LED strip, near to the extremity of the first beam that joins the second beam, is bent such that the first extremity of the first LED strip is situated on the inner side of said beams and wherein the second extremity of the second LED strip is situated on the extremity of the second beam that joins the first beam.

In this way the start section of the LED strips is also incorporated on the inner side of the roof construction in the vertex thereof. This has a number of advantages, as already described above with reference to the first alternative advantageous embodiment.

The advantages described above are also achieved with a kit of parts for assembling a roof construction as described above, wherein the set comprises said at least two beams, said at least one corner piece and said LED strip light.

The advantages described above are also achieved with a method for placing a LED strip in a roof construction as described above, wherein the method comprises determining of an overall length of one side of the roof construction, which side is formed by a beam with a corner piece on both sides; cutting of a LED strip such that the length of the LED strip is at least equal to said overall length; placing a first extremity of the LED strip on the corner edge of a first corner piece; placing the LED strip in the first corner piece, the beam and a second corner piece; and bending the LED strip near to the corner edge of the second corner piece such that the second extremity of the LED strip is situated on the inner edge of the corner piece.

BRIEF DESCRIPTION OF THE DRAWINGS

The invention will be explained in more detail below on the basis of the following description and the accompanying drawings.

FIG. 1 shows a schematic view of a canopy.

FIG. 2 shows a design of the canopy in more detail.

FIGS. 3A and 3B show a perspective view of the outer side and inner side, respectively, of a corner piece of a roof construction according to the present invention.

FIGS. 4A and 4B show the corner piece of FIGS. 3A and 3B secured between two beams and a column of the canopy of FIG. 2 with and without cover, respectively.

EMBODIMENTS OF THE INVENTION

Figure 3A:
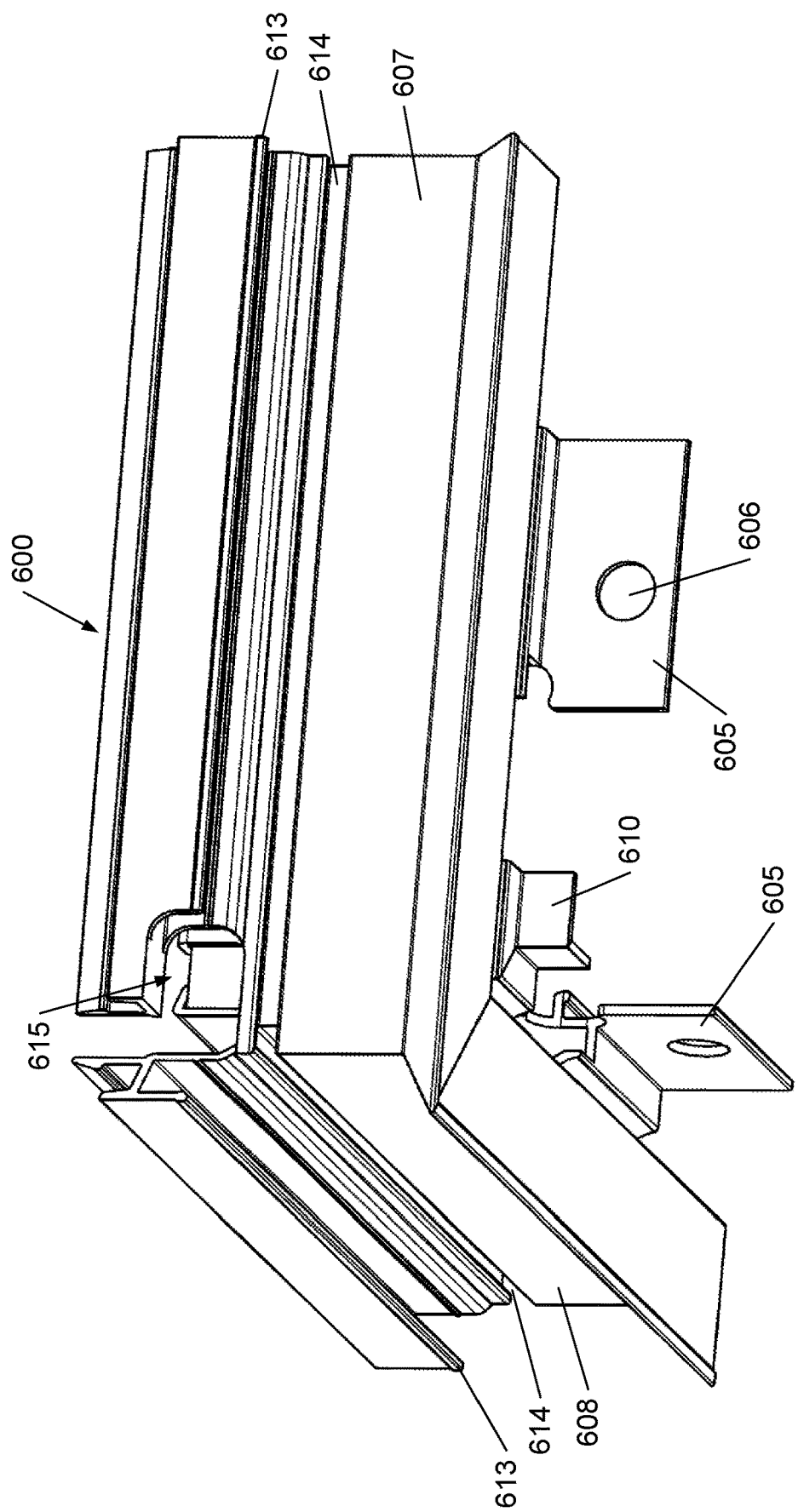

The present invention will be described below on the basis of specific embodiments and with reference to particular drawings, but the invention is not limited to these and is solely defined by the claims. The drawings shown here are solely schematic views and are not restrictive. In the drawings, the dimensions of certain components may be shown enlarged, meaning that the components in question are not shown to scale, but solely for the purpose of illustration. The dimensions and the relative dimensions do not necessarily correspond with the actual practical implementations of the invention.

Moreover, terms such as "first", "second", "third" and the like in the description and in the claims are used to make a distinction between similar elements and do not necessarily indicate a sequential or chronological order. The terms in question are interchangeable in the appropriate circumstances, and the embodiments of the invention can work in sequences other than those described here.

The term "comprising" and derivations thereof, as used in the claims, must not be interpreted as being restricted to the means that are indicated thereafter each time; the term does not exclude other elements or steps. The terms must be interpreted as a specification of the indicated characteristics, integers, steps or components to which reference is made, but without the presence or addition of one or more additional characteristics, integers, steps, components, or groups thereof being excluded. The scope of an expression such as "a device comprising means A and B" is in this case also not exclusively restricted to devices that purely consist of components A and B. In contrast, what is meant is that, as regards the present invention, the only relevant components are A and B.

The term "substantially" comprises variations of +/−10% or less, preferably +/−5% or less, more preferably +/−1% or less, and more preferably still +/−0.1% or less, of the specified state, in so far as the variations are applicable for operation in the present invention. The term "substantially A" should be understood to also comprise "A".

FIG. 1 illustrates a canopy 1 for a ground surface, for example a terrace or garden. The canopy comprises a plurality of columns 2 supporting various beams 3, 4, 5. The columns and beams together form frames to which wall infills 6 and/or roof infills 7 can be secured as described hereafter. The canopy 1 comprises three types of beams 3, 4, 5, namely:
- a beam 3 which on the outer side of the canopy 1 serves as an external pivot bar 3;
- a beam 4 which centrally in the canopy 1 serves as a central pivot bar 4; and
- a beam 5 that serves as a clamping bar 5.

It will also be appreciated that the beams 3, 4, 5 can be secured to other structures, for example a wall or façade, rather than just columns 2 as shown in FIG. 1. In this way the canopy 1 can be generally used for protecting an outdoor space, as well as an indoor space.

The canopy 1 shown in FIG. 2 comprises four support columns 2 which support a frame, also referred to as a roof frame. The frame is formed by two external pivot bars 3 and two clamping bars 5 between which a roof covering 7 is provided. In the version shown the roof covering 7 is formed by slats which at their tip extremities are rotatably secured to pivot bars 3. The slats are rotatable between an open position and a closed position. In the open position there is a gap between the slats through which, for example, light can be introduced into the space below, or leave this space below. In the closed state the slats form a closed canopy by means of which the space below can be protected from, for example, wind and/or precipitation, such as rain, hail or snow. To drain away precipitation the slats are typically set up sloping towards one of the two pivot bars 3.

The slats are typically manufactured from a rigid material. This can be aluminium, for example. Aluminium has many advantages as a material, because it is simultaneously tough and light, has good resistance to poor weather conditions and is low maintenance. However, other materials are also suitable and the advantages and disadvantages of these are assumed to be known by a skilled person. A slat can be produced using various techniques depending on the material, including extrusion, milling, folding, casting, welding, and so on. The production technique used is assumed to be known by the skilled person. Preferably the slats are manufactured by means of an extrusion process. Optionally, infill elements in, for example, polycarbonate, glass, wood, and so on, can also be used to, at least partially, fill in the hollow slats, for example to achieve a different appearance of the slat.

In one version the slats can in addition, in their open state, optionally be slidably provided in the canopy 1, to further increase the adjustment options in terms of light, radiant heat, and ventilation.

More generally, the roof covering 7 is fixed or moveable. A moveable roof covering comprises, for example, tiltable and/or slidable slats (as described above) and/or extendable and retractable screens and/or slidable panels. The individual elements of the moveable roof covering 7 in their closed position form an substantially watertight roof by means of which the space below can be protected from, for example, wind and/or precipitation, such as rain, hail or snow. This roof covering 7 is typically drained towards the pivot bars 3, 4 and from there directly or via the clamping bars 5 to the columns 2. By the sliding and/or rotation of slats and/or the panels and/or by the extension of a screen, the roof covering 7 can be at least partially opened and/or closed to thereby determine the light, radiant heat, ventilation, precipitation, etc. of choice for the space below the roof covering 7.

Wall infills 6 are typically intended to protect gaps below the canopy 1 between the columns 2. The wall infills 6 can be fixed or moveable. Movable side walls comprise, for example, extendable and retractable screens and/or wall elements that are slidable in respect of each other, etc. Fixed side walls can be manufactured from various materials, such as plastic, glass, metal, textile, wood, etc. Combinations of different wall infills 6 are similarly possible. FIG. 2 illustrates a wall infill in the form of an extendable and retractable screen 6. The screen 6 extends between two adjacent columns 2 and can be extended from the external pivot bar 3. The screen 6 serves primarily as a wind and/or sun screen.

Figure 4B:
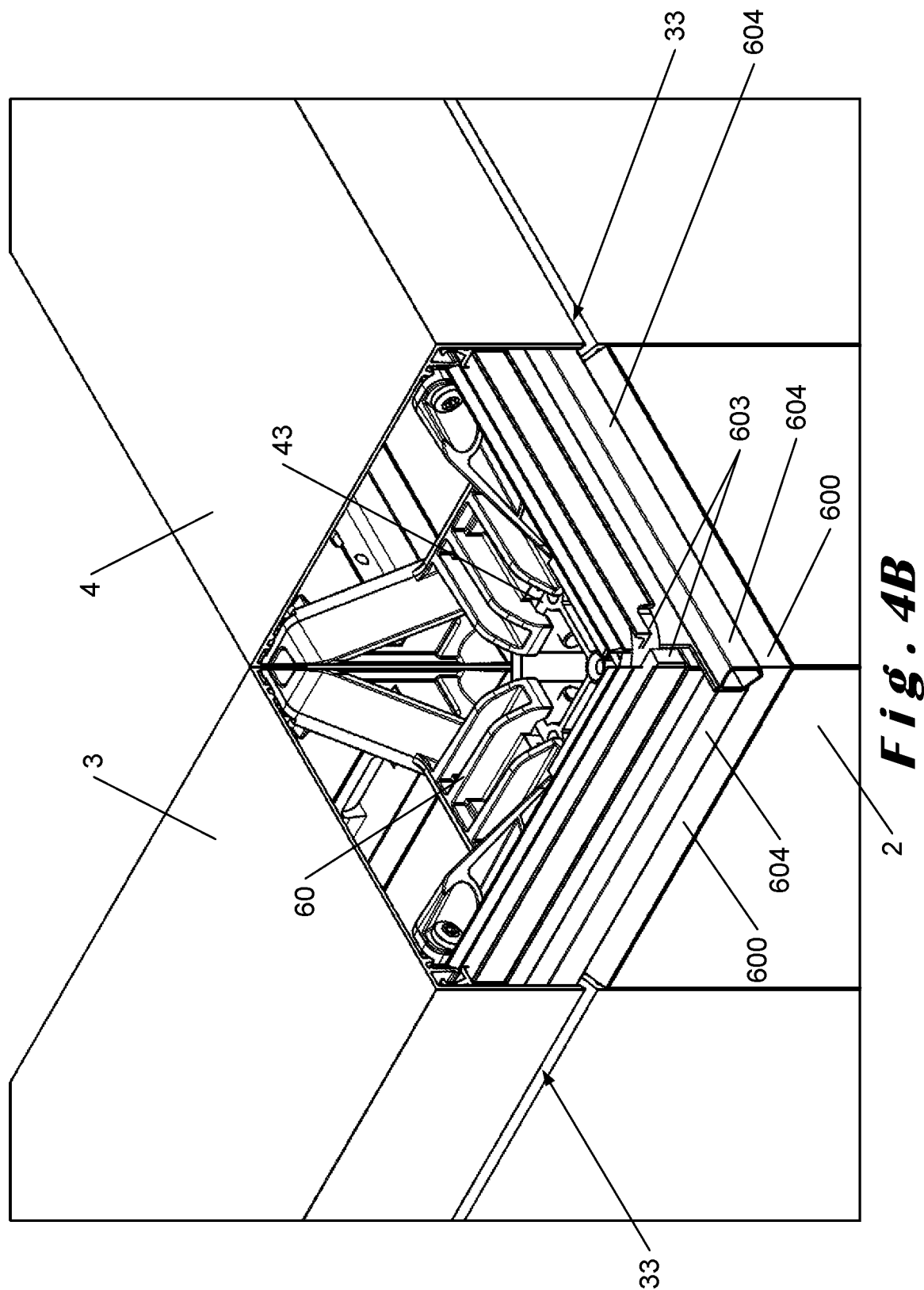

FIGS. 4A and 4B show a corner of the roof construction according to the invention concerned. FIG. 4A shows two beams 3, 4 which make an angle with each other and are supported by a column 2. Between the beams 3, 4 a cover 601 is shown that serves to hide the corner piece 600 from view and to seal the corner between the beams 3, 4. On the underside of the cover 601 an open space 602 is provided as far as the underside of the corner piece 600, which open space 602 is in the form of an elongated slit. As shown in FIG. 4A corresponding gaps 33 are provided in the beams 3, 4. These gaps 33, 602 allow light generated by a LED strip 603 secured to both the beams 3, 4 and the corner piece 600 to be visible from the outer side of the roof construction while the LED strip 603 itself is not directly visible.

FIG. 4B, in which the cover 601 has been removed, shows more details of the internal structure of the roof construction. This figure shows how each beam 3, 4 is secured by means of a bulkhead 60 to a crown 43 which in turn is secured to the column 2 (this securing is not shown). The corner piece 600 is also secured to this crown 43. More specifically, the corner piece 600 is provided with two plates 605 protruding downwards in which a bolt hole 606 is provided. Corresponding bolt holes (not shown) are provided in the crown 43 such that the corner piece 600 can be secured by means of bolts (not shown) to the crown 43.

It should be readily appreciated that the structure indicated above of the connection between the beams 3, 4, the column 2 and the corner piece 600 by means of a crown 43 is solely for illustration purposes. Other ways of forming a corner joint in the context of a roof construction for a canopy 1 are known by the skilled person and are not described here.

Figure 3C:
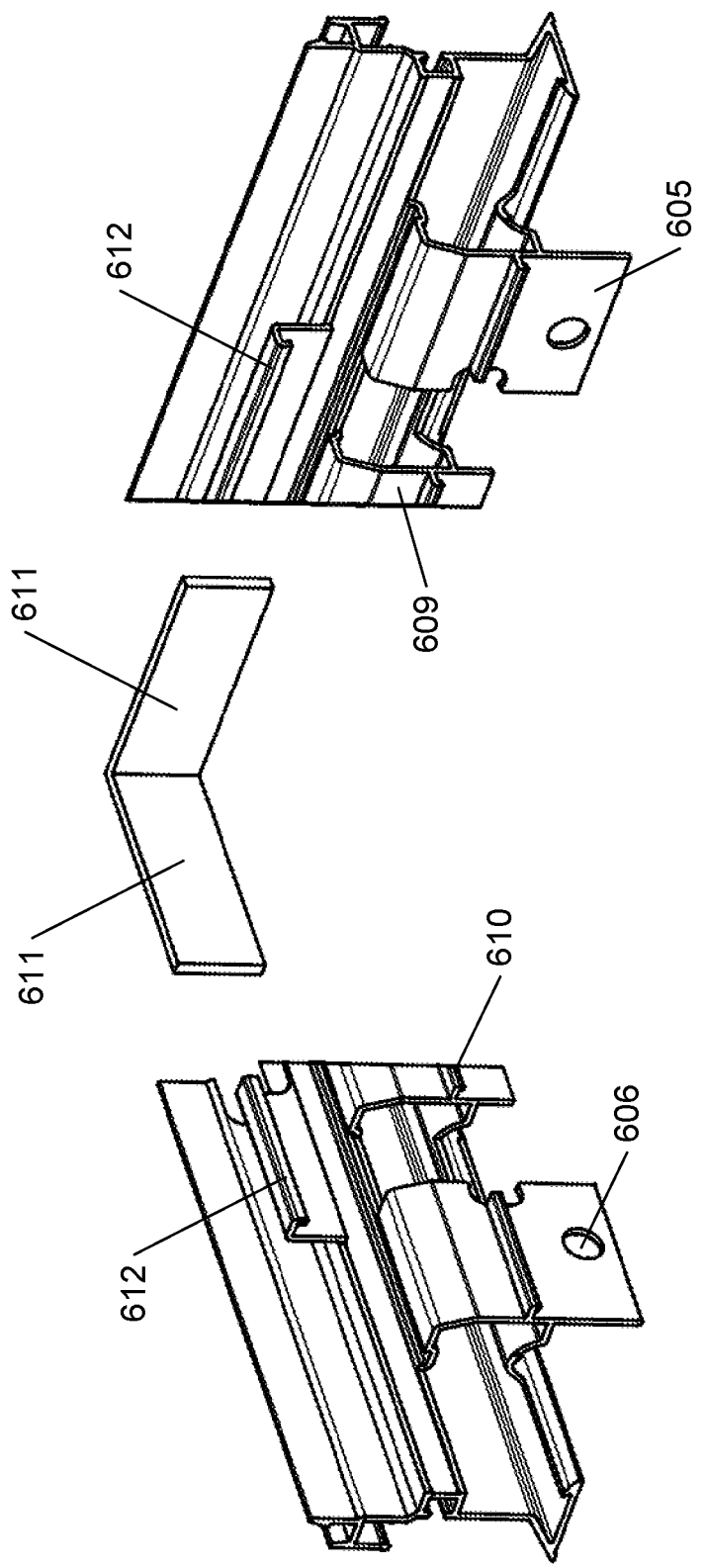
FIG. 3C shows a partially exploded view of FIG. 3B.

The corner piece 600 will be described in more detail with reference to FIGS. 3A to 3C. The corner piece 600 comprises a start profile 607 and an end profile 608. These profiles are typically manufactured from a rigid material. This can be aluminium, for example. Aluminium has many advantages as a profile material, because it is simultaneously tough and light, has good resistance to poor weather conditions and is low maintenance. However, other materials are also suitable and the advantages and disadvantages of these are assumed to be known by a skilled person. A profile can be produced using various techniques depending on the material, including extrusion, milling, folding, casting, welding, and so on. The production technique used is assumed to be known by the skilled person. On the other hand, it is also possible to manufacture the corner piece 600 as an integral part, for example as a cast part in the desired material, such as aluminium.

It must also be readily appreciated that the start profiles 607 and/or the end profiles 608 can be manufactured as integral parts with a corresponding beam 3, 4. In other words, one side of the roof construction is then formed by a profile manufactured as an integral part that can be divided into three parts, namely a first part corresponding to the start profile, a second part corresponding to the beam, and a third part corresponding to the end profile. In such a version the corner piece is then formed by a part of the first beam and a part of the second beam.

On their inner side, the profiles 607, 608 each have an upright wall section 609 which on the angled side of the profiles 607, 608 can be secured to one another. The upright wall section 609 has an inwardly directed rib 610 and together these form a support surface that fits onto a vertex of the crown 43. The profiles 607, 608 are also provided on their inner side with guide channels 612 in which a plate-shaped element 611 can be placed as best shown in FIG. 3C. These plate-shaped elements 611 are slidable in the longitudinal direction of the profiles 607, 608 via the guide channels 612 and allow the corner edges of profiles 607, 608 to align with each other on their outer side to obtain an outer side corner without gaps.

The profiles 607, 608 are further provided with a LED strip holder formed by a first U-shaped channel 613 that is downwardly open. As shown in FIG. 4B a LED strip 603 can be placed via the underside in the U-shaped channel 613. The profiles 607, 608 are also provided with a diffuser holder formed by a second U-shaped channel 614 that is outwardly open. As shown in FIG. 4B a diffuser 604 can be placed via the outer side in the U-shaped channel 614.

It should be appreciated that the start and/or end profile 607, 608 can also be constructed from several separate profiles. As an illustration, it is possible for the U-shaped channels 613, 614 to be formed by separate profiles secured to a base profile in order to thereby form the start and/or the end profile 607, 608.

Figure 5:
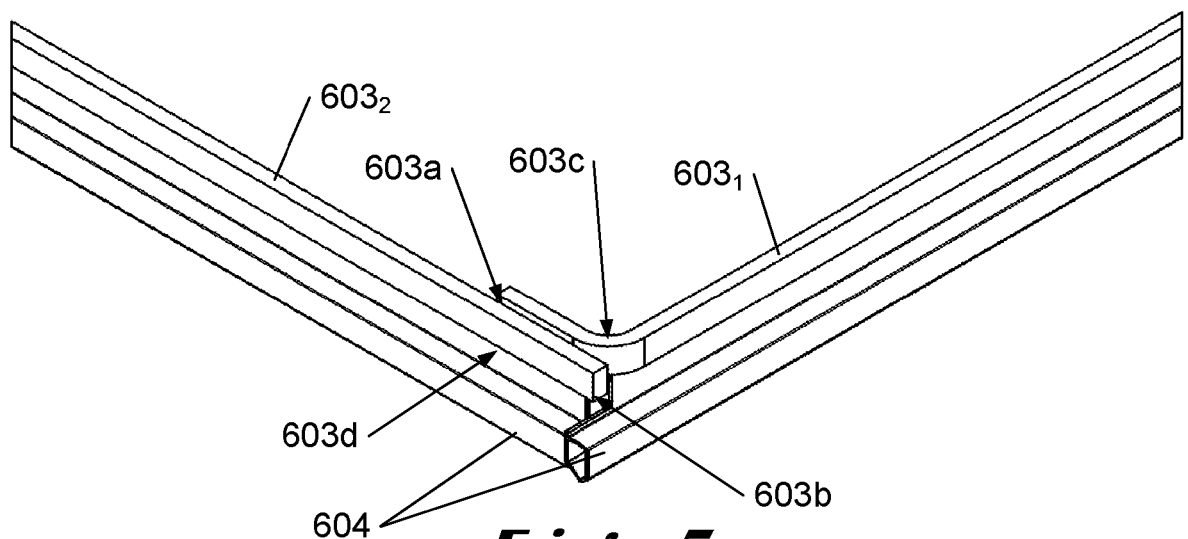
FIG. 5 shows a perspective view of the LED strips and diffuser secured to the corner piece.

FIG. 5 shows a perspective view of the LED strip light and diffusers secured to the corner piece 600. In the version shown, the LED strip light is formed by one LED strip 603 per side of the roof construction, i.e. four LED strips 603 for the entire canopy 1. Each LED strip 603 has a first extremity 603a and a second extremity 603b. The first extremity 603a forms part of the start section 603c of the LED strip 603 and the second extremity 603b forms part of the end section 603d of the LED strip 603. On the start section 603c of the LED strip 603 a power supply (not shown) is present that joins the first extremity 603a. The second extremity 603b of the LED strip 603 is the section where the LED strip 603 is cut to the desired length (i.e. slightly more than the overall length of the side of the canopy). Together with the power supply (or separately), control signals can also be sent to the LED strip light, for example concerning the colour(s) of the lighting and/or the activation time of the individual LEDs and/or the activation of just one section of the available LEDs, etc. For the sake of clarity, in the following $603_1$ will be used to denote a first LED strip and $603_2$ for a second LED strip.

The start section 603c of the LED strip $603_1$ is folded such that the first extremity 603a is positioned on the inner side of the corner piece 600 and in particular abuts the interior wall of the U-shaped channel 613 of the end profile 608. The second extremity 603b of the LED strip $603_2$ is positioned on the corner edge of the end profile 608. The LED strips $603_1$, $603_2$, as shown in FIG. 4B, extend alongside the corner piece 600 and further into the beams 3, 4. With such a configuration of the LED strips $603_1$, $603_2$, i.e. with a partial overlap in a vertex of the roof construction, the roof construction has the outward appearance of a continuous LED strip.

Figure 7A:
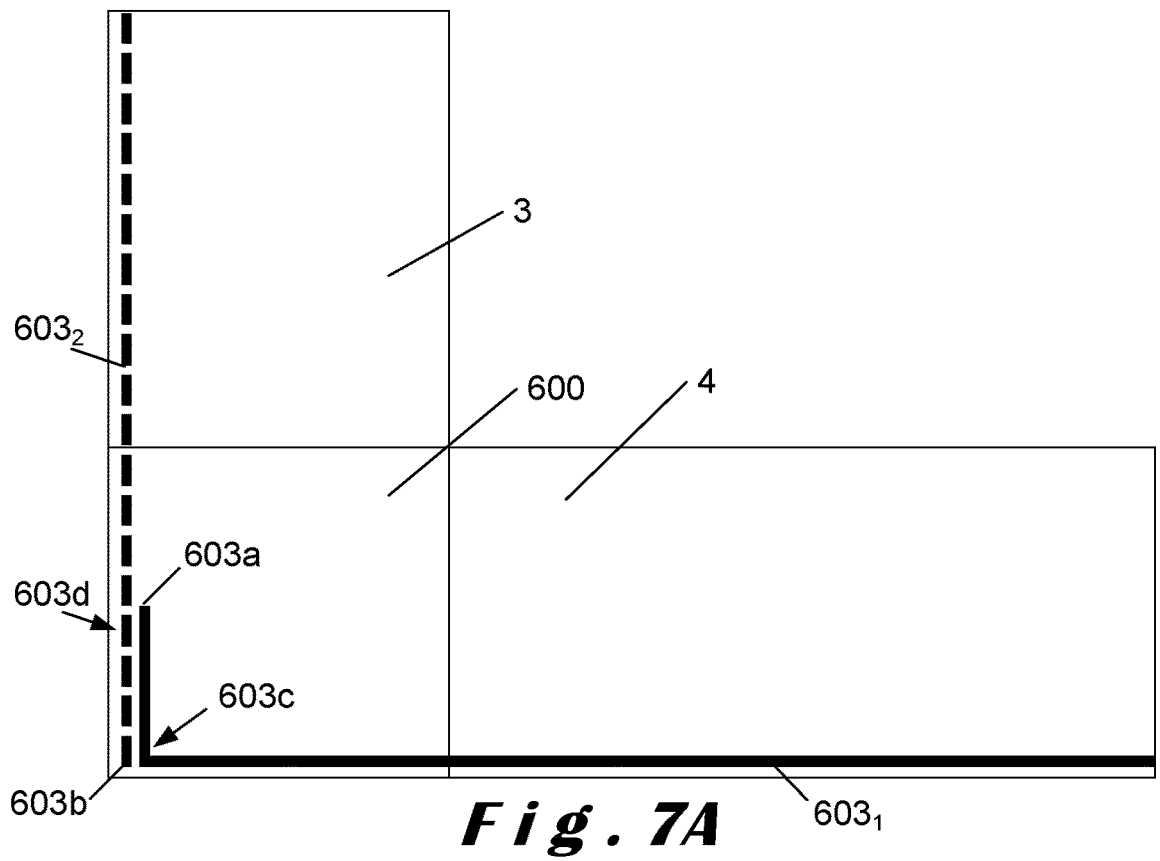
FIGS. 7A to 7J show a schematic representation of various possible configurations of the placement of the LED strips in the canopy.

The placement of the LED strips $603_1$, $603_2$ as described above is shown schematically in FIG. 7A. As already described above it is also possible to provide the transition between the LED strips $603_1$, $603_2$ at another point in the roof construction. In FIGS. 7B to 7J a number of possible configurations are shown.

Figure 7B:
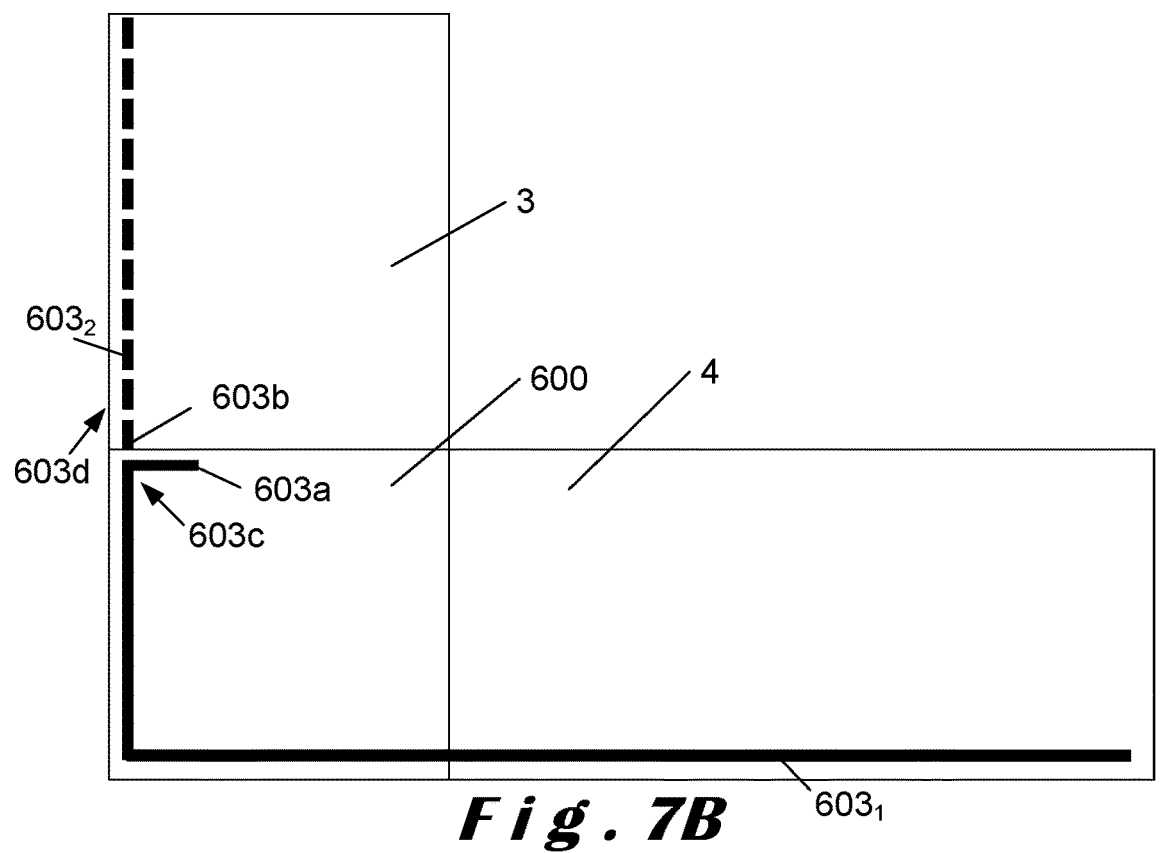

FIG. 7B shows an example of a LED strip transition between the beam 4 and the corner piece 600 wherein the start section 603c the first LED strip $603_1$ on the beam edge of the corner piece 600 at the beam 3 is bent towards the inner side of the corner piece 600 and wherein the second extremity 603b of the LED strip $603_2$ is positioned on the extremity of the beam 603 that joins the beam edge of the corner piece 600.

Figure 7C:
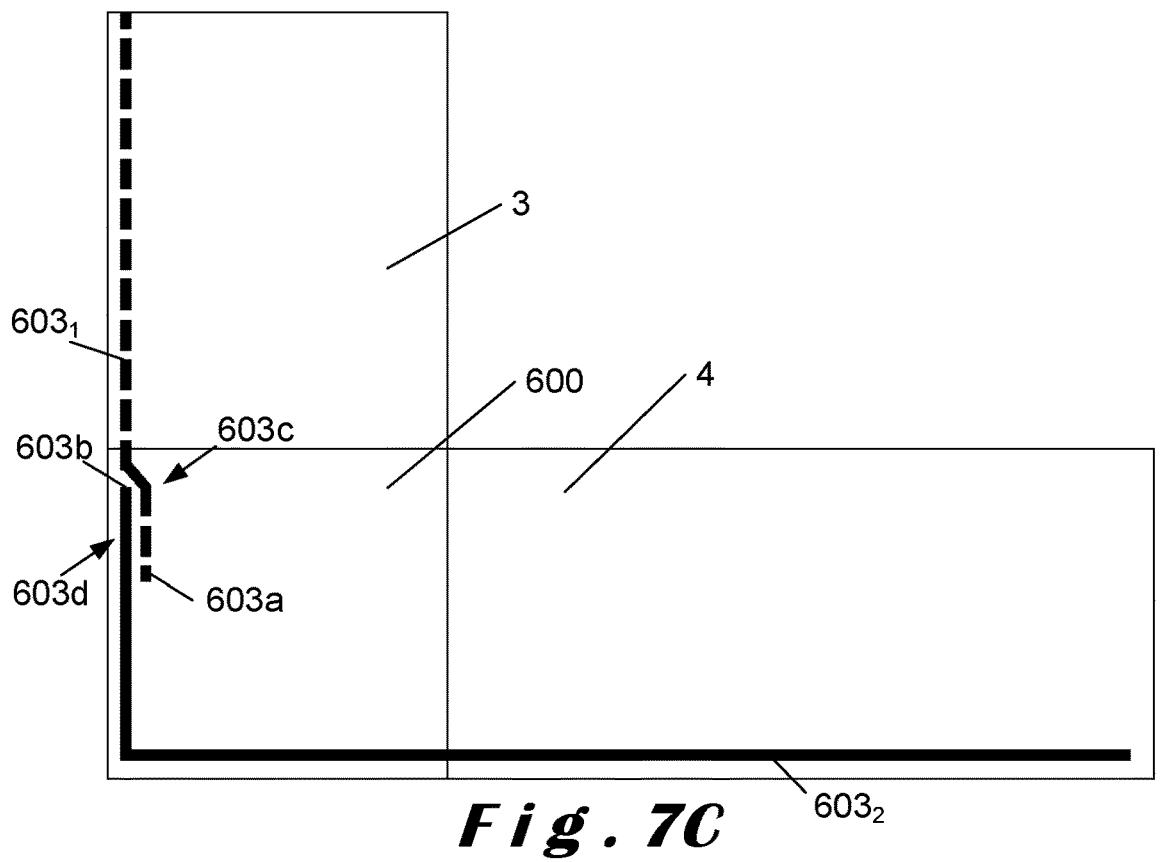

FIG. 7C shows and example of a LED strip transition in the corner piece 600. The start section 603c of the first LED strip $603_1$ on the beam edge of the corner piece 600 at the beam 3 is bent towards the inner side of the corner piece 600 and partially overlaps with the end section 603d of the LED strip $603_2$.

Figure 7D:
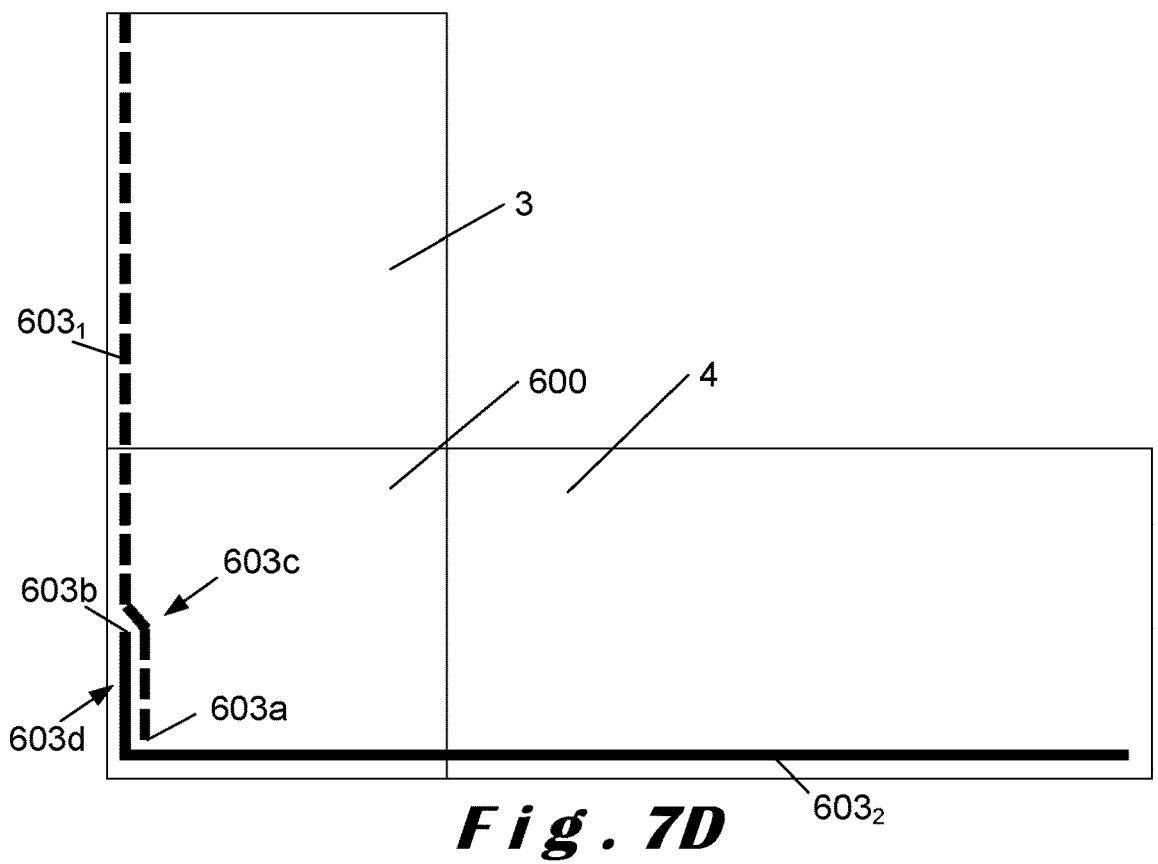

FIG. 7D shows an example of a LED strip transition in the corner piece 600. The start section 603c of the first LED strip $603_1$ is bent centrally in one side of the corner piece 600 towards the inner side of the corner piece 600 and partially overlaps with the end section 603d of the LED strip $603_2$.

Figure 7E:
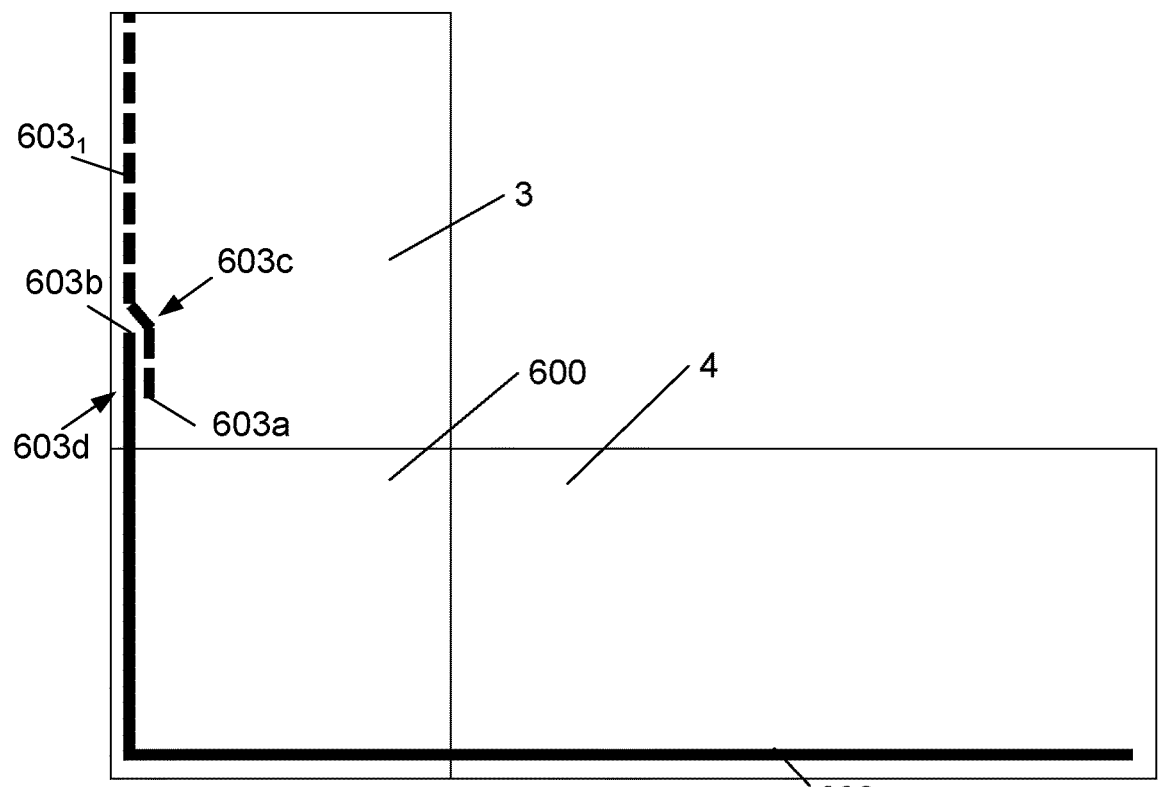

FIG. 7E shows an example of a LED strip transition in the beam 4. The start section 603c of the first LED strip $603_1$ is bent in the beam 4 towards the inner side and partially overlaps with the end section 603d of the LED strip $603_2$.

Figure 7F:
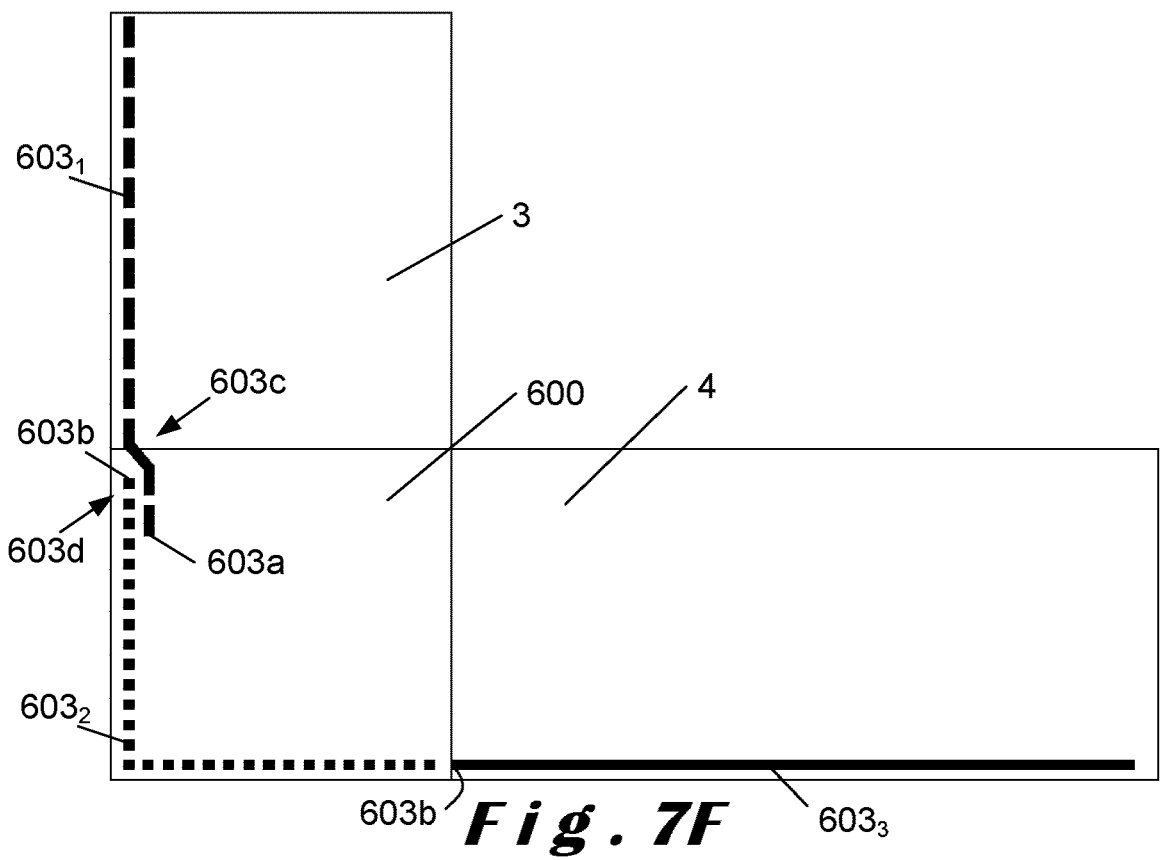

FIG. 7F shows an example of a LED strip transition in the end profile 608 of the corner piece 600. The start section 603c of the first LED strip $603_1$ on the beam edge of the corner piece 600 at the beam 3 is bent towards the inner side of the corner piece 600 and partially overlaps with the end section 603d of a second L-shaped LED strip $603_2$ that covers the entire corner piece 600. A subsequent LED strip 6033 has its extremity 603b aligned with the end of the beam 3.

Figure 7G:
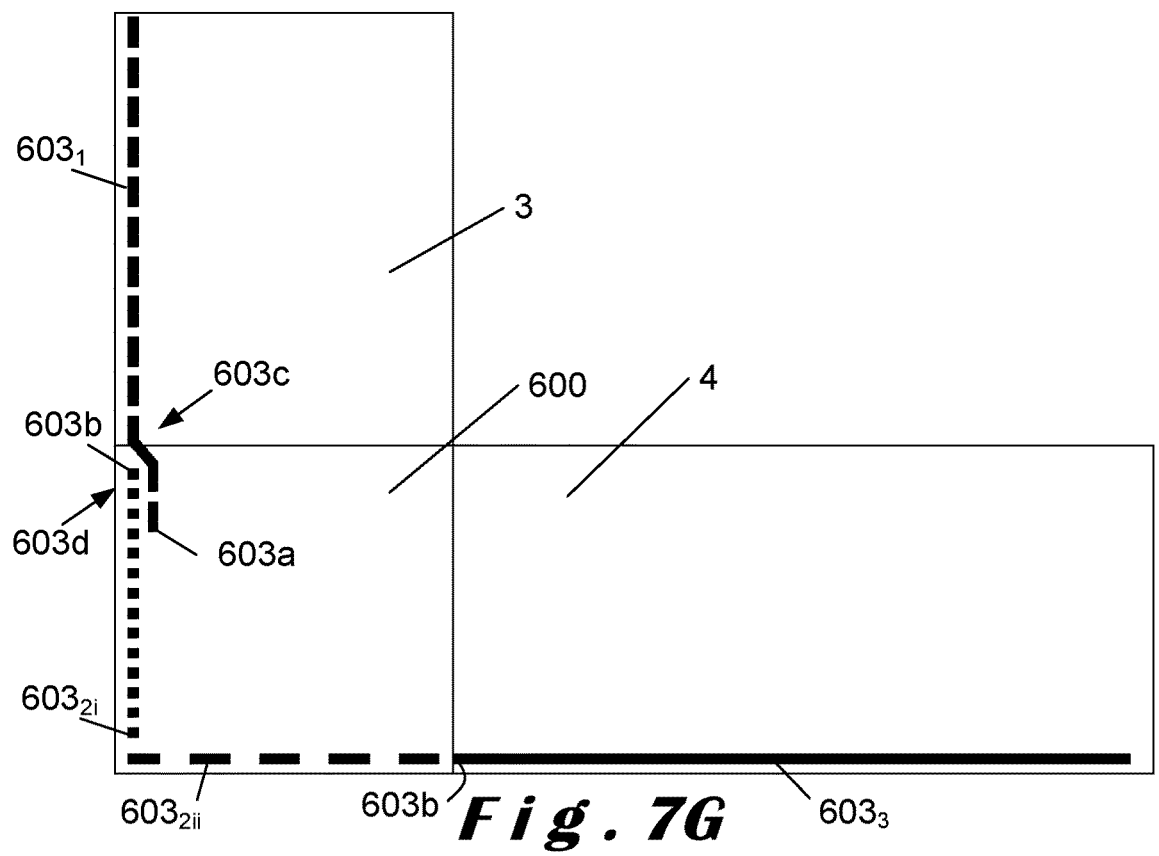

FIG. 7G shows a variation of FIG. 7F wherein the L-shaped LED strip $603_2$ is constructed from two separate LED strips $603_{2i}$ and $603_{2ii}$.

Figure 7H:
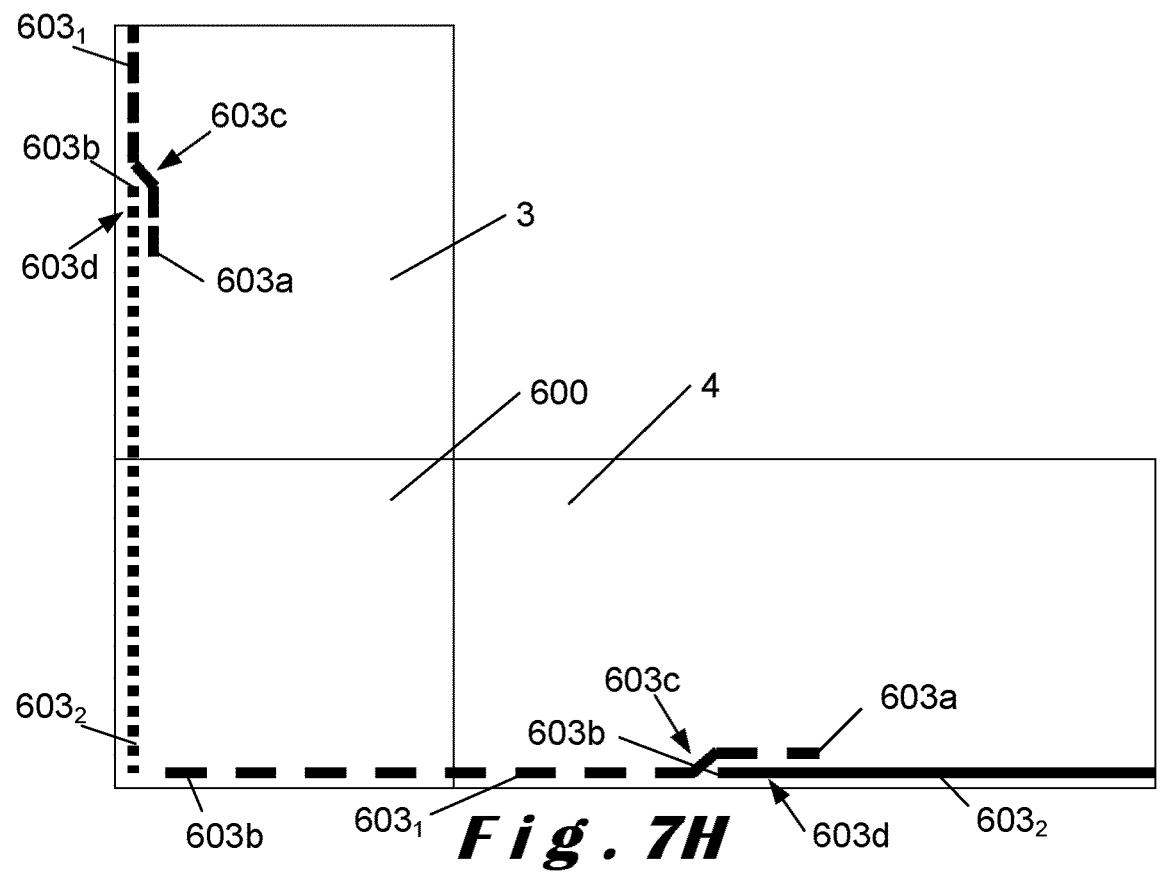

FIG. 7H shows a further variation wherein the LED strip transitions take place in the beams 3, 4 as in FIG. 7E. The advantage of this embodiment is that there is no need to trim the individual LED strips to a certain length, as the standard lengths are suitable.

Figure 7I:
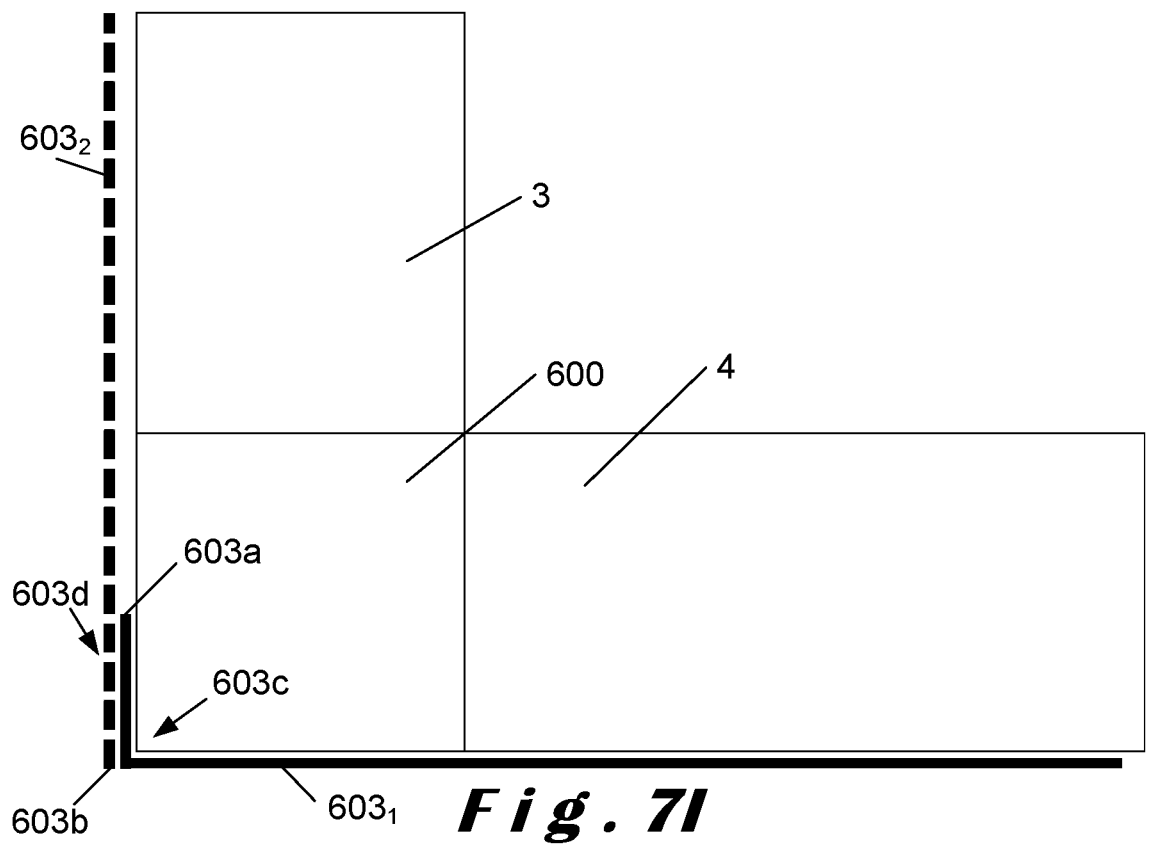

FIG. 7I illustrates a roof construction wherein the LED strips $603_1$, $603_2$ are directly secured to the outer side of the beams 3, 4 and/or the corner piece 600. In other words, the LED strips $603_1$, $603_2$ are not integrated into the roof construction. Although FIG. 7I shows a corner piece 600 it is also possible to dispense with the corner piece 600 in this version and join the beams 3, 4 directly together.

Figure 7J:
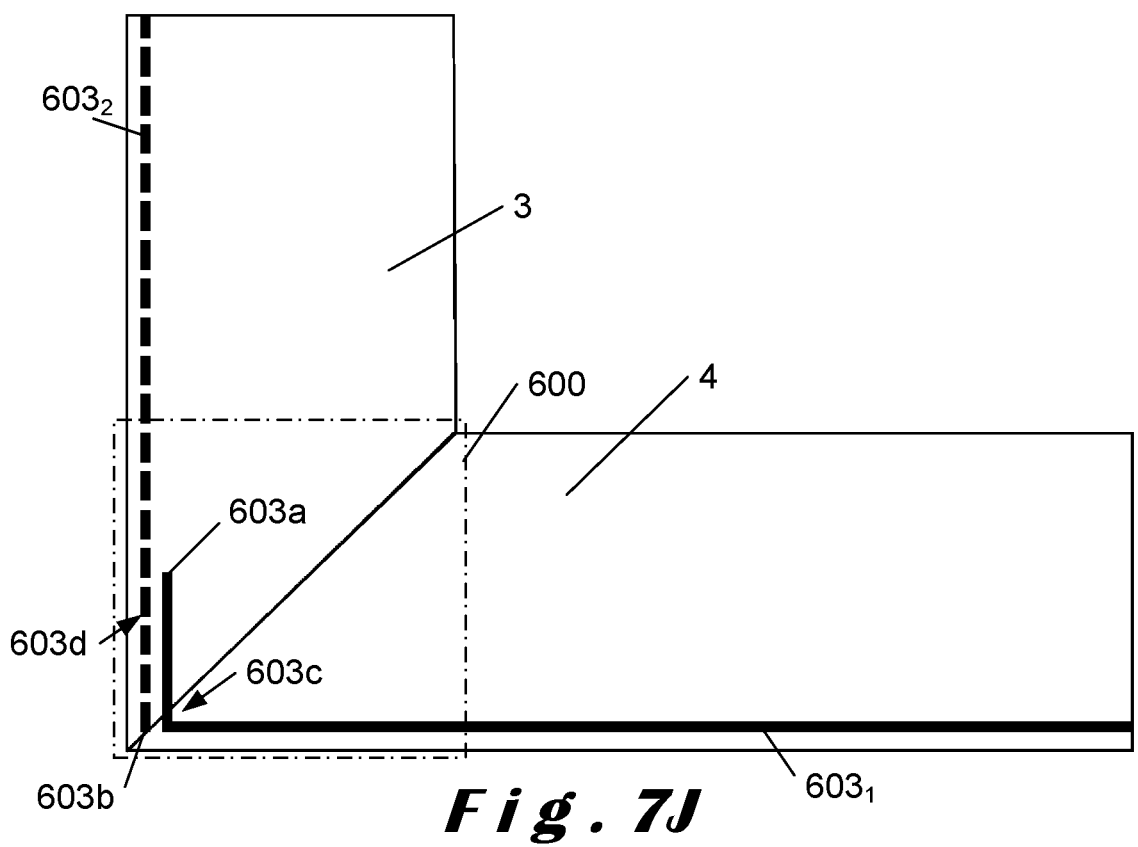

Finally, FIG. 7J illustrates a roof construction wherein no separate corner piece is provided, but in which this corner piece is an integral part of the beams 3, 4. The beams 3, 4 are in particular mitred and directly joined together. The corner piece 600 is conceptually designated by means of a rectangular frame with a dot-dash line in FIG. 7J.

It must furthermore be readily appreciated that a LED strip 603 can also be constructed from a number of separate LED strips. In particular, the LED strip 603 (for example, the section in the beam 3, 4) can also be formed by a number of separate, sequentially positioned LED strips (similar to FIG. 7H). It may also be possible for the LED strip 603 to comprise several LED strips placed in parallel.

Figure 6:
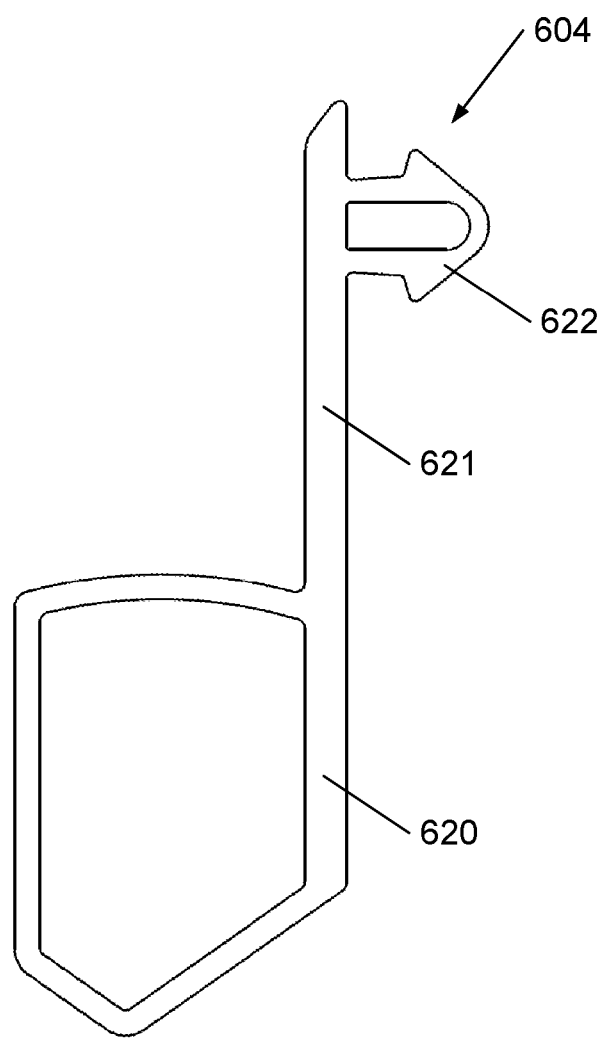
FIG. 6 shows a cross-section of the diffuser.

FIG. 5 further illustrates how, for each side of the roof construction, a diffuser 604 is placed. The diffuser 604 is shown in cross-section in FIG. 6. The diffuser 604 comprises a transparent hollow tube 620 and a plate section 621 extending to the top of the roof construction. On the inner side of the plate section 621 a connection, in particular a pin 622, is provided that can be secured in the U-shaped channel 614. Following assembly, the transparent hollow tube 620 is wedged between the inner side of the cover 601 and the outer side of the profiles 607, 608. This prevents dirt and the like, via the recess 602, from contaminating the LED strip 603 or the space below, which would adversely affect the light intensity. The hollow tube 620 is also advantageous in comparison with a non-hollow tube because the hollow tube 620 lowers the light intensity of the LED strip 603. The plate section 621 on the other hand, although the diffuser holder 614 is positioned at a safe distance from the recess 602, allows the hollow tube 620 (which primarily ensures light diffusion) to nevertheless be placed close to, in particular above, the recess 602. In this way the colour of the cover 601 and/or the corner piece 600 has less influence on the colour of the light beamed by the LED strip 603.

Because the LED strip 603 at its start section 603c is bent towards the inner side of the corner piece 600, there is a recess 615 (shown in FIG. 3A) in the start profile 607, and in particular the U-shaped channel 613, or at least the interior wall thereof, is interrupted. The recess 615 is such that the U-shaped channel 613 has a length that is smaller than, in particular smaller than 95%, more particularly smaller than 90%, and in particular larger than 50%, more particularly larger than 70%, most particularly larger than 80% of the length of the start profile 607. In the end profile 608 the U-shaped channel 613 is not interrupted, such that the LED strip 603 is at most secured to the end profile 608.

As already described above, the LED strips 603 are preferably already placed in advance in the beams 3, 4 such that during assembly of the canopy 1, it is only necessary to place the end sections 603c, 603d of the LED strips 603 in corner pieces 600 opposite each other, in particular in the U-shaped channels 613 thereof. This just leaves the start section 603c of the LED strip 603 to be bent towards the inner side of the corner piece 600 such that the power supply can be connected to the first extremity 603a of the LED strip.

In the embodiment shown, use is made of LED strips that are embedded in U-shaped channels such that the LED strips provide lighting on their short side (i.e. their underside in the version shown). Other types of LED strips are known to the skilled person, however, namely LED strips that provide lighting on their long side (i.e. their front side). The rear of such LED strips is then typically self-adhesive. It should be readily appreciated that both types of LED strips can be used in the present invention.

Although certain aspects of the present invention are described in relation to specific embodiments, it is clear that these aspects can be implemented in other forms within the scope of protection as provided for by the claims.

What is claimed is:

1. A roof construction for a canopy, wherein the roof construction comprises:
   at least two beams making an angle with each other, each having an inner side and an outer side;
   a corner piece positioned between the at least two beams, wherein:
      the corner piece has an inner side and an outer side; and
      the corner piece is provided with a diffuser holder;
   at least one diffuser which is at least partially supported by the diffuser holder; and
   a LED strip light that extends substantially continuously across the outer side of the corner piece and across an outer side of at least a part of each of the at least two beams.

2. The roof construction according to claim 1, wherein the corner piece comprises a start profile and an end profile, each of which has a beam edge, a corner edge, an inner edge and an outer edge,
   wherein the beam edge and the corner edge are opposite each other and wherein the inner edge and the outer edge are opposite each other,
   wherein the inner edges of the start profile and the end profile together form the inner side of the corner piece and wherein the outer edges of the start profile and the end profile together form the outer side of the corner piece,
   wherein the start profile substantially connects to a first beam of the at least two beams at its beam edge,
   wherein the end profile substantially connects to a second beam of the at least two beams at the beam edge of the end profile and wherein the corner edges of the start profile and the end profile are at least partially aligned with each other, and
   wherein the LED strip light comprises a first LED strip and a second LED strip, which each comprise a start section with a first extremity and an end section with a second extremity.

3. The roof construction according to claim 2, wherein the first LED strip is positioned in the start profile and the first beam and the second LED strip in the end profile and the second beam, wherein the start section of the first LED strip, near to the corner edge of the start profile, is bent such that the first extremity of the first LED strip is situated on the inner side of the corner piece, and wherein the second extremity of the second LED strip is positioned on the corner edge of the corner piece.

4. The roof construction according to claim 2, wherein the first LED strip is positioned in the first beam, the start profile, and the end profile and the second LED strip in the second beam, wherein the start section of the first LED strip, near to the beam edge of the end profile, is bent such that the first extremity of the first LED strip is situated on the inner side of the corner piece and wherein, the second extremity of the second LED strip is situated on an extremity of the second beam which substantially joins the beam edge of the end profile.

5. The roof construction according to claim 2, wherein the first LED strip is positioned in the first beam and the second LED strip in the start profile, the end profile, the first beam and the second beam, wherein the start section of the first LED strip is bent such that the first extremity of the first LED strip is situated on the inner side of the second beam and wherein the second extremity of the second LED strip is positioned near to the bent section of the first LED strip.

6. The roof construction according to claim 2, wherein the start profile, from its beam edge over a section of its length, is provided with a LED strip holder in which a part of the LED strip light is placed, wherein the section over which the start profile is provided with the LED strip holder is smaller than its length and larger than 50% of its length.

7. The roof construction according to claim 6, wherein each LED strip holder is formed by a U-shaped part of the start profile, or the end profile, respectively.

8. The roof construction according to claim 7, wherein the first LED strip is positioned in the start profile and the first beam and the second LED strip is positioned in the end profile and the second beam, wherein the start section of the first LED strip, near to the corner edge of the start profile, is bent such that the first extremity of the first LED strip is situated on the inner side of the corner piece, and wherein the second extremity of the second LED strip is situated on the corner edge of the corner piece, and
   wherein the start section of the first LED strip at least partially abuts the U-shaped part of the end profile.

9. The roof construction according to claim 6, wherein each LED strip holder is formed by a substantially flat plate section.

10. The roof construction according to claim 2, wherein the end profile is provided over its entire length with a LED strip holder in which a section of the LED strip light is placed.

11. The roof construction according to claim 2, wherein the start profile and the end profile each have a slideable wall section on its inner edge, which wall sections make an angle with each other.

12. The roof construction according to claim 1, wherein the roof construction is also provided with a cover that is placed on top of the corner piece, wherein, on the outer side of the corner piece, an elongated recess is present between the cover and the corner piece.

13. The roof construction according to claim 1, wherein the diffuser holder is positioned below the LED strip light.

14. The roof construction according to claim 1, wherein the diffuser comprises a transparent hollow tube.

15. The roof construction according to claim 14, wherein the diffuser holder is formed by a further U-shaped part of the corner piece, wherein an open side of the further U-shaped part is directed towards the outer side of the corner piece.

16. The roof construction according to claim 14, wherein the diffuser further comprises a plate section that is rigidly fixed in the diffuser holder, wherein the transparent hollow tube is rigidly fixed to an underside of the plate section.

17. The roof construction according to claim 1, wherein the roof construction is further provided with a cover which is placed on top of the corner piece, wherein, on the outer side of the corner piece, an elongated recess is present between the cover and the corner piece, and
   wherein the diffuser comprises a transparent hollow tube that is wedged between the cover and the corner piece.

18. The roof construction according to claim 1, wherein the corner piece comprises a start profile and an end profile, each of which has a beam edge, a corner edge, an inner edge and an outer edge, wherein the beam edge and the corner edge are opposite each other and wherein the inner edge and the outer edge are opposite each other, wherein the inner edges of the start profile and the end profile together form the inner side of the corner piece and wherein the outer edges of the start profile and the end profile together form the outer side of the corner piece, wherein the start profile substantially connects to a first of the at least two beams at its beam edge, wherein the end profile substantially connects to a second of the at least two beams at its beam edge and wherein the corner edges of the start profile and the end profile are at least partially aligned with each other, wherein the LED strip light comprises a first LED strip and a second LED strip which each comprise a start section with a first extremity and an end section with a second extremity, and
   wherein the at least one diffuser comprises a first diffuser and a second diffuser, wherein the first diffuser is positioned in the start profile and the first beam and the second diffuser in the end profile and the second beam, wherein each diffuser extends over an entire length of the first beam or the second beam, respectively, and the start profile or the end profile, respectively.

19. A roof construction for a canopy, wherein the roof construction comprises:
   at least two beams making an angle with each other, each having an inner side and an outer side, wherein the at least two beams are at least partially aligned with each other;
   a corner piece positioned between the at least two beams, the corner piece having an inner side and an outer side, wherein the corner piece is formed by a section of a first beam of the at least two beams and a section of a second beam of the at least two beams; and
   a LED strip light that extends substantially continuously across the outer side of the corner piece and across an outer side of at least a part of each of the at least two beams, wherein:
      the LED strip light comprises a first LED strip and a second LED strip which each comprise a start section with a first extremity and an end section with a second extremity;
      the first LED strip is substantially positioned in the first beam of the at least two beams and the second LED strip is substantially positioned in the second beam of the at least two beams; and
      the start section of the first LED strip, near to an extremity of the first beam that joins the second beam, is bent such that the first extremity of the first LED strip is situated on the inner side of the at least two beams and wherein the second extremity of the second LED strip is situated on an extremity of the second beam that joins the first beam.

20. A method for placing a LED strip in a roof construction, the method comprises:
   determining of an overall length of one side of the roof construction, the one side being formed by a first beam with a first corner piece on one end and a second corner piece on an opposite end, wherein the roof construction comprises:
      at least two beams, comprising the first beam, making an angle with each other, each having an inner side and an outer side;
      the first corner piece positioned between the at least two beams, the first corner piece having an inner side and an outer side, wherein the first corner piece comprises a start profile and an end profile, each of which has a beam edge, a corner edge, an inner edge, and an outer edge, wherein the beam edge and the corner edge are opposite each other and wherein the inner edge and the outer edge are opposite each other, wherein the inner edges of the start profile and the end profile together form the inner side of the first corner piece and wherein the outer edges of the start profile and the end profile together form the outer side of the first corner piece, wherein the start profile substantially connects to a first beam of the at least two beams at its beam edge, wherein the end profile substantially connects to a second beam of the at least two beams at its beam edge and wherein the corner edges of the start profile and the end profile are at least partially aligned with each other; and
      the second corner piece positioned adjacent the first beam on the opposite end of the first beam that is positioned the first corner piece, wherein the second corner piece comprises a start profile and an end profile, each of which has a beam edge, a corner edge, an inner edge and an outer edge, wherein the beam edge and the corner edge are opposite each other and wherein the inner edge and the outer edge are opposite each other, wherein the inner edges of the start profile and the end profile together form the inner side of the second corner piece and wherein the outer edges of the start profile and the end profile together form the outer side of the second corner piece, wherein the start profile substantially connects to a further beam at its beam edge, wherein the end profile substantially connects to the first beam at its beam edge and wherein the corner edges of the start profile and the end profile are at least partially aligned with each other;
   cutting of a LED strip such that the length of the LED strip is at least equal to the overall length;
   placing a first extremity of the LED strip on the corner edge of the first corner piece;
   placing the LED strip in the first corner piece, the first beam and the second corner piece; and
   bending the LED strip near to the corner edge of the second corner piece such that a second extremity of the LED strip is situated on the inner edge of the second corner piece.

* * * * *